US008744846B2

(12) United States Patent
Jung et al.

(10) Patent No.: US 8,744,846 B2
(45) Date of Patent: Jun. 3, 2014

(54) PROCEDURE FOR PROCESSING NOISY SPEECH SIGNALS, AND APPARATUS AND COMPUTER PROGRAM THEREFOR

(75) Inventors: Sung Il Jung, Ansan-si (KR); Dong Gyung Ha, Busan (KR)

(73) Assignee: Transono Inc., Seoul (KR)

( * ) Notice: Subject to any disclaimer, the term of this patent is extended or adjusted under 35 U.S.C. 154(b) by 799 days.

(21) Appl. No.: 12/935,339

(22) PCT Filed: Nov. 27, 2008

(86) PCT No.: PCT/KR2008/006999
§ 371 (c)(1),
(2), (4) Date: Sep. 29, 2010

(87) PCT Pub. No.: WO2009/123387
PCT Pub. Date: Oct. 8, 2009

(65) Prior Publication Data
US 2011/0029310 A1 Feb. 3, 2011

(30) Foreign Application Priority Data

Mar. 31, 2008 (KR) ........................ 10-2008-0030015

(51) Int. Cl.
*G10L 21/00* (2013.01)
(52) U.S. Cl.
USPC ............................ 704/226; 704/210; 704/233
(58) Field of Classification Search
USPC .................................................. 704/226, 233
See application file for complete search history.

(56) References Cited

U.S. PATENT DOCUMENTS

| 6,098,038 | A  | * | 8/2000  | Hermansky et al. | 704/226 |
|-----------|----|---|---------|------------------|---------|
| 6,289,309 | B1 | * | 9/2001  | deVries          | 704/233 |
| 6,351,731 | B1 |   | 2/2002  | Anderson et al.  |         |
| 6,453,289 | B1 | * | 9/2002  | Ertem et al.     | 704/225 |
| 6,810,273 | B1 | * | 10/2004 | Mattila et al.   | 455/570 |
| 6,859,773 | B2 | * | 2/2005  | Breton           | 704/226 |
| 7,003,452 | B1 | * | 2/2006  | Lubiarz et al.   | 704/210 |
| 7,171,246 | B2 | * | 1/2007  | Mattila et al.   | 455/570 |
| 7,889,874 | B1 | * | 2/2011  | Ayad             | 381/94.2 |
| 7,912,567 | B2 | * | 3/2011  | Chhatwal et al.  | 700/94  |
| 2002/0002455 | A1 | * | 1/2002 | Accardi et al.   | 704/226 |
| 2005/0027520 | A1 | * | 2/2005 | Mattila et al.   | 704/228 |
| 2005/0226431 | A1 | * | 10/2005 | Mao             | 381/61  |

(Continued)

OTHER PUBLICATIONS

Martin. "Noise Power Spectral Density Estimation Based on Optimal Smoothing and Minimum Statistics" 2001.*

(Continued)

*Primary Examiner* — Douglas Godbold
(74) *Attorney, Agent, or Firm* — Occhiuti & Rohlicek LLP

(57) ABSTRACT

Provided are a noise state determination method and an apparatus and a computer readable recording medium therefor. A noisy speech signal processing method according to the present invention includes calculating a transformed spectrum by transforming an input noisy speech signal to a frequency domain; calculating a smoothed magnitude spectrum by reducing magnitude differences of the transformed spectrum between neighboring frames; calculating a search spectrum which represents an estimated noise component of the smoothed magnitude spectrum; and calculating an identification ratio which represents a ratio of a noise component included in the input noisy speech signal, by using the smoothed magnitude spectrum and the search spectrum. Since a small amount of calculation is required and a large-capacity memory is not required, the present invention may be easily implemented as hardware or software. Also, since an adaptive operation is performed with respect to each frequency sub-band, the accuracy of determining a noise state may be improved.

19 Claims, 13 Drawing Sheets

(56) References Cited

U.S. PATENT DOCUMENTS

| | | |
|---|---|---|
| 2006/0053007 A1* | 3/2006 | Niemisto ................... 704/233 |
| 2006/0253283 A1* | 11/2006 | Jabloun .................... 704/233 |
| 2006/0265215 A1* | 11/2006 | Hetherington et al. ....... 704/226 |
| 2006/0293885 A1* | 12/2006 | Gournay et al. ............ 704/223 |
| 2007/0055508 A1* | 3/2007 | Zhao et al. ................ 704/226 |
| 2008/0059164 A1* | 3/2008 | Furuta et al. .............. 704/226 |
| 2008/0167866 A1* | 7/2008 | Hetherington et al. ....... 704/228 |
| 2008/0189104 A1* | 8/2008 | Zong et al. ................ 704/226 |
| 2008/0281589 A1* | 11/2008 | Wang et al. ............... 704/226 |
| 2009/0106021 A1* | 4/2009 | Zurek et al. .............. 704/226 |

OTHER PUBLICATIONS

Martin. "Noise power spectral density estimation based on optimal smoothing and minimum statistics" IEEE Trans. On speech and audio processing; 9(5):504-512 (2001).

\* cited by examiner

PROCEDURE FOR PROCESSING NOISY SPEECH SIGNALS, AND APPARATUS AND COMPUTER PROGRAM THEREFOR

This application is the National Stage of International Application No. PCT/KR2008/006999, filed on Nov. 27, 2008, which claims the priority date of Korean Application No. 10-2008-0030015, filed on Mar. 31, 2008 the contents of both being hereby incorporated by reference in their entirety.

TECHNICAL FIELD

The present invention relates to speech signal processing, and more particularly, to a method of processing a noisy speech signal by, for example, determining a noise state of the noisy speech signal, estimating noise of the noisy speech signal, and improving sound quality by using the estimated noise, and an apparatus and a computer readable recording medium therefor.

BACKGROUND ART

Since speaker phones allow easy communication among a plurality of people and can separately provide a handsfree structure, the speaker phones are essentially included in various communication devices. Currently, communication devices for video telephony become popular due to the development of wireless communication technology. As communication devices capable of reproducing multimedia data or media reproduction devices such as portable multimedia players (PMPs) and MP3 players become popular, local-area wireless communication devices such as bluetooth devices also become popular. Furthermore, hearing aids for those who cannot hear well due to bad hearing have been developed and provided. Such speaker phones, hearing aids, communication devices for video telephony, and bluetooth devices include a noisy speech signal processing apparatus for recognizing speech data in a noisy speech signal, i.e., a speech signal including noise or for extracting an enhanced speech signal from the noisy speech signal by removing or weakening background noise.

The performance of the noisy speech signal processing apparatus decisively influences the performance of a speech-based application apparatus including the noisy speech signal processing apparatus, because the background noise almost always contaminates a speech signal and thus can greatly reduce the performance of the speech-based application apparatus such as a speech codec, a cellular phone, and a speech recognition device. Thus, research has been actively conducted on a method of efficiently processing a noisy speech signal by minimizing influence of the background noise.

Speech recognition generally refers to a process of transforming an acoustic signal obtained by a microphone or a telephone, into a word, a set of words, or a sentence. A first step for increasing the accuracy of the speech recognition is to efficiently extract a speech component, i.e., an acoustic signal from a noisy speech signal input through a single channel. In order to extract only the speech component from the noisy speech signal, a method of processing the noisy speech signal by, for example, determining which one of noise and speech components is dominant in the noisy speech signal or accurately determining a noise state, should be efficiently performed.

Also, in order to improve sound quality of the noisy speech signal input through a single channel, only the noise component should be weakened or removed without damaging the speech component. Thus, the method of processing the noisy speech signal input through a single channel basically includes a noise estimation method of accurately determining the noise state of the noisy speech signal and calculating the noise component in the noisy speech signal by using the determined noise state. An estimated noise signal is used to weaken or remove the noise component from the noisy speech signal.

Various methods for improving sound quality by using the estimated noise signal exist. One of the methods is a spectral subtraction (SS) method. The SS method subtracts a spectrum of the estimated noise signal from a spectrum of the noisy speech signal, thereby obtaining an enhanced speech signal by weakening or removing noise from the noisy speech signal.

A noisy speech signal processing apparatus using the SS method should accurately estimate noise more than anything else and the noise state should be accurately determined in order to accurately estimate the noise. However, it is not easy at all to determine the noise state of the noisy speech signal in real time and to accurately estimate the noise of the noisy speech signal in real time. In particular, if the noisy speech signal is contaminated in various non-stationary environments, it is very hard to determine the noise state, to accurately estimate the noise, or to obtain the enhanced speech signal by using the determined noise state and the estimated noise signal.

If the noise is inaccurately estimated, the noisy speech signal may have two side effects. First, the estimated noise can be smaller than actual noise. In this case, annoying residual noise or residual musical noise can be detected in the noisy speech signal. Second, the estimated noise can be larger than the actual noise. In this case, speech distortion can occur due to excessive SS.

A large number of methods have been suggested in order to determine the noise state and to accurately estimate the noise of the noisy speech signal. One of the methods is a voice activation detection (VAD)-based noise estimation method. According to the VAD-based noise estimation method, the noise state is determined and the noise is estimated, by using statistical data obtained in a plurality of previous noise frames or a long previous frame. A noise frame refers to a silent frame or a speech-absent frame which does not include the speech component, or to a noise dominant frame where the noise component is overwhelmingly dominant in comparison to the speech component.

The VAD-based noise estimation method has an excellent performance when noise does not greatly vary based on time. However, for example, if the background noise is non-stationary or level-varying, if a signal to noise ratio (SNR) is low, or if a speech signal has a weak energy, the VAD-based noise estimation method cannot easily obtain reliable data regarding the noise state or a current noise level. Also, the VAD-based noise estimation method requires a high cost for calculation.

In order solve the above problems of the VAD-based noise estimation method, various new methods have been suggested. One well-known method is a recursive average (RA)-based weighted average (WA) method. The RA-based WA method estimates the noise in the frequency domain and continuously updates the estimated noise, without performing VAD. According to the RA-based WA method, the noise is estimated by using a forgetting factor that is fixed between a magnitude spectrum of the noise speech signal in a current frame and the magnitude spectrum of the noise estimated in a previous frame. However, since the fixed forgetting factor is used, the RA-based WA method cannot reflect noise variations in various noise environments or a non-stationary noise environment and thus cannot accurately estimate the noise.

Another noise estimation method suggested in order to cope with the problems of the VAD-based noise estimation method, is a method of using a minimum statistics (MS) algorithm. According to the MS algorithm, a minimum value of a smoothed power spectrum of the noisy speech signal is traced through a search window and the noise is estimated by multiplying the traced minimum value by a compensation constant. Here, the search window covers recent frames in about 1.5 seconds. In spite of a generally excellent performance, since data of a long previous frame corresponding to the length of the search window is continuously required, the MS algorithm requires a large-capacity memory and cannot rapidly trace noise level variations in a noise dominant signal that is mostly occupied by a noise component. Also, since data regarding the estimated noise of a previous frame is basically used, the MS algorithm cannot obtain a reliable result when a noise level greatly varies or when a noise environment changes.

In order to solve the above problems of the MS algorithm, various corrected MS algorithms have been suggested. Two most common characteristics of the corrected MS algorithms are as described below. First, the corrected MS algorithms use a VAD method of continuously verifying whether a current frame or a frequency bin, which is a target to be considered, includes a speech component or is a silent sub-band. Second, the corrected MS algorithms use an RA-based noise estimator.

However, although the problems of the MS algorithm, for example, a problem of time delay of noise estimation and a problem of inaccurate noise estimation in a non-stationary environment, can be solved to a certain degree, such corrected MS algorithms cannot completely solve those problems, because the MS algorithm and the corrected MS algorithms intrinsically use the same method, i.e., a method of estimating noise of a current frame by reflecting and using an estimated noise signal of a plurality of previous noise frames or a long previous frame, thereby requiring a large-capacity memory and a large amount of calculation.

Thus, the MS algorithm and the corrected MS algorithms cannot rapidly and accurately estimate background noise of which level greatly varies, in a variable noise environment or in a noise dominant frame. Furthermore, the VAD-based noise estimation method, the MS algorithm, and the corrected MS algorithms not only require a large-capacity memory in order to determine the noise state but also require a high cost for a quite large amount of calculation.

DISCLOSURE OF INVENTION

Technical Problem

The present invention provides a noisy speech signal processing method capable of accurately determining a noise state of an input noisy speech signal under non-stationary and various noise conditions, accurately determining noise-like and speech-like sub-bands by using a small-capacity memory and a small amount of calculation, or determining the noise state for speech recognition, and an apparatus and a computer readable recording medium therefor.

The present invention also provides a noisy speech signal processing method capable of accurately estimating noise of a current frame under non-stationary and various noise conditions, improving sound quality of a noisy speech signal processed by using the estimated noise, and effectively inhibiting residual musical noise, and an apparatus and a computer readable recording medium therefor.

The present invention also provides a noisy speech signal processing method capable of rapidly and accurately tracing noise variations in a noise dominant signal and effectively preventing time delay from being generated, and an apparatus and a computer readable recording medium therefor.

The present invention also provides a noisy speech signal processing method capable of preventing speech distortion caused by an overvalued noise level of a signal that is mostly occupied by a speech component, and an apparatus and a computer readable recording medium therefor.

Technical Solution

According to an aspect of the present invention, there is provided a noise state determination method of a noisy speech signal, the method including calculating a transformed spectrum by transforming an input noisy speech signal to a frequency domain; calculating a smoothed magnitude spectrum by reducing magnitude differences of the transformed spectrum between neighboring frames; calculating a search spectrum which represents an estimated noise component of the smoothed magnitude spectrum; and calculating an identification ratio which represents a ratio of a noise component included in the input noisy speech signal, by using the smoothed magnitude spectrum and the search spectrum.

According to another aspect of the present invention, there is provided a method of processing a noisy speech signal of a time domain, the method including generating a transformed signal by performing Fourier transformation on the noisy speech signal; performing forward searching so as to calculate a search signal which represents an estimated noise component of the noisy speech signal (=>transformed signal??); and determining a noise state of the noisy speech signal by using the transformed signal and the search signal, wherein the search signal is calculated by applying a forgetting factor to the transformed signal of a current frame and a signal having a smaller magnitude between the search signal and the transformed signal of a previous frame.

According to another aspect of the present invention, there is provided a noise state determination apparatus of a noisy speech signal, the apparatus including a conversion unit for calculating a transformed spectrum by transforming an input noisy speech signal to a frequency domain; a smoothing unit for calculating a smoothed magnitude spectrum by reducing magnitude differences of the transformed spectrum between neighboring frames; a forward searching unit for calculating a search spectrum which represents an estimated noise component of the smoothed magnitude spectrum; and a noise state determination unit for calculating an identification ratio which represents a ratio of a noise component included in the input noisy speech signal, by using the smoothed magnitude spectrum and the search spectrum.

According to another aspect of the present invention, there is provided an apparatus for processing a noisy speech signal of a time domain, wherein the apparatus generates a transformed signal by performing Fourier transformation on the noisy speech signal; performs forward searching so as to calculate a search signal which represents an estimated noise component of the transformed signal; and determines a noise state of the noisy speech signal by using the transformed signal and the search signal, and wherein the search signal is calculated by applying a forgetting factor to the transformed signal of a current frame and a signal having a smaller magnitude between the search signal and the transformed signal of a previous frame.

According to another aspect of the present invention, there is provided a computer readable recording medium having recorded thereon a computer program for executing a noise state determination method of a noisy speech signal, the method including calculating a transformed spectrum by transforming an input noisy speech signal to a frequency domain; calculating a smoothed magnitude spectrum by reducing magnitude differences of the transformed spectrum between neighboring frames; calculating a search spectrum which represents an estimated noise component of the smoothed magnitude spectrum; and calculating an identification ratio which represents a ratio of a noise component included in the input noisy speech signal, by using the smoothed magnitude spectrum and the search spectrum.

According to another aspect of the present invention, there is provided a computer readable recording medium having recorded thereon a computer program for executing a method of processing a noisy speech signal of a time domain, the method including generating a transformed signal by performing Fourier transformation on the noisy speech signal; performing forward searching so as to calculate a search signal which represents an estimated noise component of the transformed signal; and determining a noise state of the noisy speech signal by using the transformed signal and the search signal, wherein the search signal is calculated by applying a forgetting factor to the transformed signal of a current frame and a signal having a smaller magnitude between the search signal and the transformed signal of a previous frame.

Advantageous Effects

According to the present invention, a search spectrum may be calculated with respect to a current frame or each of two or more sub-bands of the current frame by using a forward searching method, and a noise state may be determined by using only an identification ratio calculated by using the search spectrum. Thus, the amount of calculation is greatly reduced and a large-capacity memory is not required in comparison to a conventional method. Accordingly, the present invention may be easily implemented as hardware or software. Also, the noise state may be rapidly determined in a non-stationary environment where a noise level greatly varies or in a variable noise environment. Furthermore, since an adaptive operation is performed with respect to each frequency sub-band, the accuracy of determining the noise state may be improved.

MODE FOR THE INVENTION

Figure 1:
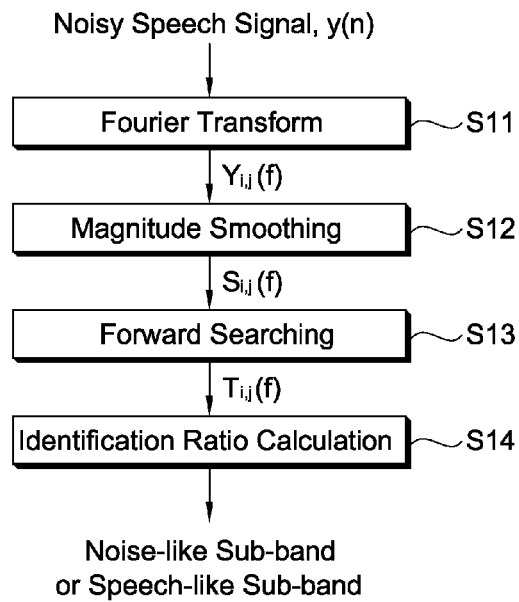
FIG. 1 is a flowchart of a noise state determination method of an input noisy speech signal, according to a first embodiment of the present invention.

FIG. 1 is a flowchart of a noise state determination method of an input noisy speech signal y(n), as a method of processing a noisy speech signal, according to a first embodiment of the present invention.

Referring to FIG. 1, the noise state determination method according to the first embodiment of the present invention includes performing Fourier transformation on the input noisy speech signal y(n) (operation S11), performing magnitude smoothing (operation S12), performing forward searching (operation S13), and calculating an identification ratio (operation S14). Each operation of the noise state determination method will now be described in more detail.

Initially, the Fourier transformation is performed on the input noisy speech signal y(n) (operation S11). The Fourier transformation is continuously performed on short-time signals of the input noisy speech signal y(n) such that the input noisy speech signal y(n) may be approximated into a Fourier spectrum (FS) $Y_i(f)$.

The input noisy speech signal y(n) may be represented by using a sum of a clean speech component and an additive noise component as shown in Equation 1. In Equation 1, n is a discrete time index, x(n) is a clean speech signal, and w(n) is an additive noise signal.

MathFigure 1

$$y(n)=x(n)+w(n) \qquad [\text{Math.1}]$$

The FS $Y_i(f)$ calculated by approximating the input noisy speech signal y(n) may be represented as shown in Equation 2.

MathFigure 2

$$Y_i(f)=X_i(f)+W_i(f) \qquad [\text{Math.2}]$$

In Equation 2, i and f respectively are a frame index and a frequency bin index, $X_i(f)$ is a clean speech FS, and $W_i(f)$ is a noise FS.

According to the current embodiment of the present invention, a bandwidth size of a frequency bin, i.e., a sub-band size is not specially limited. For example, the sub-band size may cover a whole frequency range or may cover a bandwidth obtained by equally dividing the whole frequency range by two, four, or eight. In particular, if the sub-band size covers a bandwidth obtained by dividing the whole frequency range by two or more, subsequent methods such as a noise state determination method, a noise estimation method, and a sound quality improvement method may be performed by dividing an FS into sub-bands. In this case, an FS of a noisy speech signal in each sub-band may be represented as $Y_{i,j}(f)$. Here, j (0≤j<J<L. J and L are natural numbers for respectively determining total numbers of sub-bands and frequency bins.) is a sub-band index obtained by dividing a whole frequency $2^L$ by a sub-band size ($=2^{L-J}$).

Then, the magnitude smoothing is performed on the FS $Y_i(f)$ (operation S12). The magnitude smoothing may be performed with respect to a whole FS or each sub-band. The magnitude smoothing is performed in order to reduce the magnitude deviation between signals of neighboring frames, because, generally, if a large magnitude deviation exists between the signals of neighboring frames, a noise state may not be easily determined or actual noise may not be accurately calculated by using the signals. As such, instead of the FS $Y_i(f)$ on which the magnitude smoothing is not performed, a smoothed spectrum calculated by reducing the magnitude deviation between the signals of neighboring frames by applying a smoothing factor $\alpha_s$, is used in a subsequent method such as a forward searching method.

As a result of performing the magnitude smoothing on the FS $Y_i(f)$, a smoothed magnitude spectrum $S_i(f)$ may be output as shown in Equation 3. If the magnitude smoothing is performed on the FS $Y_{i,j}(f)$ with respect to sub-band, an output smoothed magnitude spectrum may be represented as $S_{i,j}(f)$.

MathFigure 3

$$S_i(f)=\alpha_s S_{i-1}(f)+(1-\alpha_s)|Y_i(f)| \qquad [\text{Math.3}]$$

If the magnitude smoothing is performed before the forward searching is performed, a valley portion of a speech component may be prevented from being wrongly determined as a noise-like region or a noise dominant frame in the subsequent forward searching method, because, if an input signal having a relatively large deviation is used in the forward searching method, a search spectrum may correspond to the valley portion of the speech component.

In general, since a speech signal having a relatively large magnitude exists before or after the valley portion of the speech component in a speech-like region or a speech dominant period, if the magnitude smoothing is performed, the magnitude of the valley portion of the speech component relatively increased. Thus, by performing the magnitude smoothing, the valley portion may be prevented from corresponding to the search spectrum in the forward searching method.

Then, the forward searching is performed on the output smoothed magnitude spectrum $S_i(f)$ (operation S13). The forward searching may be performed on each sub-band. In this case, the smoothed magnitude spectrum $S_{i,j}(f)$ is used. The forward searching is performed in order to estimate a noise component in a smoothed magnitude spectrum with respect to a whole frame or each sub-band of the whole frame.

In the forward searching method, the search spectrum is calculated or updated by using only a search spectrum of a previous frame and/or using only a smoothed magnitude spectrum of a current frame and a spectrum having a smaller magnitude between the search spectrum and a smoothed magnitude spectrum of the previous frame. By performing the forward searching as described above, various problems of a conventional voice activation detection (VAD)-based method or a corrected minimum statistics (MS) algorithm, for example, a problem of inaccurate noise estimation in an abnormal noise environment or a large noise level variation environment, a large amount of calculation, or a quite large amount of data of previous frames to be stored, may be efficiently solved. Search spectrums according to three forward searching methods will now be described in detail.

Equation 4 mathematically represents an example of a search spectrum according to a first-type forward searching method.

MathFigure 4

$$T_{i,j}(f)=\kappa(j)\cdot U_{i-1,j}(f)+(1-\kappa(j))\cdot S_{i,j}(f) \qquad [\text{Math.4}]$$

Here, i is a frame index, and j (0≤j<J<L) is a sub-band index obtained by dividing a whole frequency $2^L$ by a sub-band size ($=2^{L-J}$). J and L are natural numbers for respectively determining total numbers of sub-bands and frequency bins. $T_{i,j}(f)$ is a search spectrum according to the first-type forward searching method, and $S_{i,j}(f)$ is a smoothed magnitude spectrum according to Equation 3. $U_{i-1,j}(f)$ is a weighted spectrum for reflecting a degree of forward searching performed on a previous frame, and may indicate, for example, a spectrum having a smaller magnitude between a search spectrum and a smoothed magnitude spectrum of the previous frame. $\kappa(j)$ (0<$\kappa$(J−1)≤$\kappa$(j)≤$\kappa$(0)≤1) is a differential forgetting factor for reflecting a degree of updating between the weighted spectrum $U_{i-1,j}(f)$ of the previous frame and the smoothed magnitude spectrum $S_{i,j}(f)$ of a current frame, in order to calculate the search spectrum $T_{i,j}(f)$.

Referring to Equation 4, in the first-type forward searching method according to the current embodiment of the present invention, the search spectrum $T_{i,j}(f)$ of the current frame is calculated by using a smoothed magnitude spectrum $S_{i-1,j}(f)$ or a search spectrum $T_{i-1,j}(f)$ of the previous frame, and the smoothed magnitude spectrum $S_{i-1,j}(f)$ of the current frame. In more detail, if the search spectrum $T_{i-1,j}(f)$ of the previous frame has a smaller magnitude than the smoothed magnitude spectrum $S_{i-1,j}(f)$ of the previous frame, the search spectrum $T_{i,j}(f)$ of the current frame is calculated by using the search spectrum $T_{i-1,j}(f)$ of the previous frame and the smoothed magnitude spectrum $S_{i,j}(f)$ of the current frame. On the other hand, if the search spectrum $T_{i-1,j}(f)$ of the previous frame has a larger magnitude than the smoothed magnitude spectrum $S_{i-1,j}(f)$ of the previous frame, the search spectrum $T_{i,j}(f)$ of the current frame is calculated by using the smoothed magnitude spectrum $S_{i-1,j}(f)$ of the previous frame and the smoothed magnitude spectrum $S_{i,j}(f)$ of the current frame, without using the search spectrum $T_{i-1,j}(f)$ of the previous frame.

Thus, in the first-type forward searching method, the search spectrum $T_{i-1,j}(f)$ of the current frame is calculated by using the smoothed magnitude spectrum $S_{i,j}(f)$ of the current frame and a spectrum having a smaller magnitude between the search spectrum $T_{i-1,j}(f)$ and the smoothed magnitude spectrum $S_{i-1,j}(f)$ of the previous frame. In this case, the spectrum having a smaller magnitude between the search spectrum $T_{i-1,j}(f)$ and the smoothed magnitude spectrum $S_{i-1,j}(f)$ of the previous frame may be referred to as a 'weighted spectrum'.

A forgetting factor (indicated as $\kappa(j)$ in Equation 4) is also used to calculate the search spectrum $T_{i,j}(f)$ of the current frame. The forgetting factor is used to reflect a degree of updating between the weighted spectrum $U_{-1,j}(f)$ of the previous frame and the smoothed magnitude spectrum $S_{i,j}(f)$ of the current frame. This forgetting factor may be a differential forgetting factor $\kappa(j)$ that varies based on the sub-band index j. In this case, the differential forgetting factor $\kappa(j)$ may be represented as shown in Equation 5.

MathFigure 5

$$\kappa(j) = \frac{J\kappa(0) - j(\kappa(0) - \kappa(J-1))}{J} \quad \text{[Math. 5]}$$

The differential forgetting factor $\kappa(j)$ varies based on a sub-band because, generally, a low-frequency band is mostly occupied by voiced sound, i.e., a speech signal and a high-frequency band is mostly occupied by voiceless sound, i.e., a noise signal. In Equation 5, the differential forgetting factor $\kappa(j)$ has a relatively large value in the low-frequency band such that the search spectrum $T_{i-1,j}(f)$ or the smoothed magnitude spectrum $S_{i-1,j}(f)$ of the previous frame is reflected on the search spectrum $T_{i,j}(f)$ at a relatively high rate. On the other hand, the differential forgetting factor $\kappa(j)$ has a relatively small value in the high-frequency band such that the smoothed magnitude spectrum $S_{i,j}(f)$ of the current frame is reflected on the search spectrum $T_{i,j}(f)$ at a relatively high rate.

Figure 2:
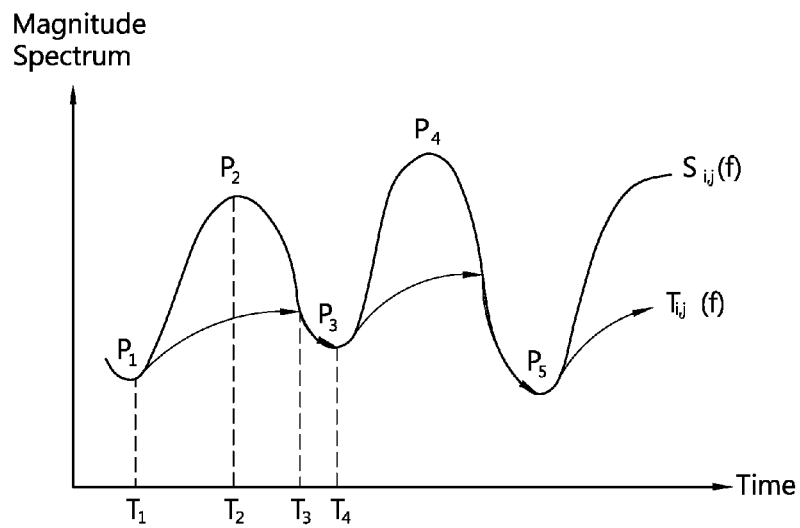
FIG. 2 is a graph of a search spectrum according to a first-type forward searching method.

FIG. 2 is a graph of the search spectrum $T_{i,j}(f)$ according to the first-type forward searching method (Equation 4). In FIG. 2, a horizontal axis represents a time direction, i.e., a direction that the frame index j increases, and a vertical direction represents a magnitude spectrum (the smoothed magnitude spectrum $S_{i,j}(f)$ or the search spectrum $T_{i,j}(f)$. However, in FIG. 2, the smoothed magnitude spectrum $S_{i,j}(f)$ and the search spectrum $T_{i,j}(f)$ are exemplarily and schematically illustrated without illustrating their details.

Referring to FIG. 2, the search spectrum $T_{i,j}(f)$ according to Equation 4 starts from a first minimum point P1 of the smoothed magnitude spectrum $S_{i,j}(f)$ and increases by following the smoothed magnitude spectrum $S_{i,j}(f)$ (however, a search spectrum $T_{i,j}(f)$ of a first frame has the same magnitude as a smoothed magnitude spectrum $S_{i,j}(f)$ of the first frame). The search spectrum $T_{i,j}(f)$ may increase at a predetermined slope that is smaller than that of the smoothed magnitude spectrum $S_{i,j}(f)$. The slope of the search spectrum $T_{i,j}(f)$ is not required to be fixed. However, the current embodiment of the present invention does not exclude a fixed slope. As a result, in a first-half search period where the smoothed magnitude spectrum $S_{i,j}(f)$ increases, for example, from a time $T_1$ corresponding to the first minimum point $P_1$ till a time $T_2$ corresponding to a first maximum point $P_2$ of the smoothed magnitude spectrum $S_{i,j}(f)$, the difference between the smoothed magnitude spectrum $S_{i,j}(f)$ and the search spectrum $T_{i,j}(f)$ generally increases.

Then, after the time $T_2$ corresponding to the first maximum point $P_2$, i.e., in a search period where the smoothed magnitude spectrum $S_{i,j}(f)$ decrease, the difference between the smoothed magnitude spectrum $S_{i,j}(f)$ and the search spectrum $T_{i,j}(f)$ decreases because the magnitude of the search spectrum $T_{i,j}(f)$ is maintained or increases little by little. In this case, at a predetermined time $T_3$ before a time $T_4$ corresponding to a second minimum point $P_3$ of the smoothed magnitude spectrum $S_{i,j}(f)$, the search spectrum $T_{i,j}(f)$ meets the smoothed magnitude spectrum $S_{i,j}(f)$. After the time $T_3$, the search spectrum $T_{i,j}(f)$ decreases by following the smoothed magnitude spectrum $S_{i,j}(f)$ till the time $T_4$ corresponding to the second minimum point $P_3$. In this case, the magnitudes of the smoothed magnitude spectrum $S_{i,j}(f)$ and the search spectrum $T_{i,j}(f)$ varies almost the same.

In FIG. 2, a trace of the search spectrum $T_{i,j}(f)$ between the first minimum point $P_1$ and the second minimum point $P_3$ of the smoothed magnitude spectrum $S_{i,j}(f)$ is similarly repeated in a search period between the second minimum point $P_3$ and a third minimum point $P_5$ of the smoothed magnitude spectrum $S_{i,j}(f)$ and other subsequent search periods.

As such, in the first-type forward searching method according to the current embodiment of the present invention, the search spectrum $T_{i,j}(f)$ of the current frame is calculated by using the smoothed magnitude spectrum $S_{i,j}(f)$ or the search spectrum $T_{i-1,j}(f)$ of the previous frame, and the smoothed magnitude spectrum $S_{i,j}(f)$ of the current frame, and the search spectrum $T_{i,j}(f)$ is continuously updated. Also, the search spectrum $T_{i,j}(f)$ may be used to estimate the ratio of noise of the input noisy speech signal y(n) with respect to sub-band, or to estimate the magnitude of noise, which will be describe later in detail.

Then, second-type and third-type forward searching methods are performed.

Although the second-type and third-type forward searching methods are different from the first-type forward searching method in that two divided methods are separately performed, the basic principal of the second-type and third-type forward searching methods is the same as that of the first-type forward searching method. In more detail, in each of the second-type and third-type forward searching methods, a single search period (for example, between neighboring minimum points of the smoothed magnitude spectrum $S_{i,j}(f)$) is divided into two sub-periods and the forward searching is performed with different traces in the sub-periods. The search period may be divided into a first sub-period where a smoothed magnitude spectrum increases and a second sub-period where the smoothed magnitude spectrum decreases.

Equation 6 mathematically represents an example of a search spectrum according to the second-type forward searching method.

MathFigure 6

$$T_{i,j}(f) = \begin{cases} \kappa(j) \cdot U_{i-1,j}(f) + (1 - \kappa(j)) \cdot S_{i,j}(f), & \text{if } S_{i,j}(f) > S_{i-1,j}(f) \\ T_{i-1,j}(f), & \text{otherwise} \end{cases} \quad \text{[Math. 6]}$$

Symbols used in Equation 6 are the same as those in Equation 4. Thus, detailed descriptions thereof will be omitted here.

Referring to Equation 6, in the second-type forward searching method according to the current embodiment of the present invention, in a first-half search period (for example, a first sub-period where the smoothed magnitude spectrum $S_{i,j}(f)$ increases), the search spectrum $T_{i,j}(f)$ of the current frame is calculated by using the smoothed magnitude spectrum $S_{i-1,j}(f)$ or the search spectrum $T_{i-1,j}(f)$ of the previous frame, and the smoothed magnitude spectrum $S_{i,j}(f)$ of the current frame.

On the other hand, in a second-half search period (for example, a second sub-period where the smoothed magnitude spectrum $S_{i,j}(f)$ decreases), the search spectrum $T_{i,j}(f)$ of the current frame is calculated by using only the search spectrum $T_{i-1,j}(f)$ of the previous frame. For example, as shown in Equation 6, the search spectrum $T_{i,j}(f)$ of the current frame may be regarded as having the same magnitude as the search spectrum $T_{i-1,j}(f)$ of the previous frame. However, in this case, the search spectrum $T_{i,j}(f)$ may have a larger magnitude than the smoothed magnitude spectrum $S_{i,j}(f)$, and the search spectrum $T_{i,j}(f)$ is updated by using the same method used in the first sub-period in a period after the search spectrum $T_{i,j}(f)$ meets the smoothed magnitude spectrum $S_{i,j}(f)$, because the search spectrum $T_{i,j}(f)$ is an estimated noise component and thus cannot have a larger magnitude than the smoothed magnitude spectrum $S_{i,j}(f)$.

Similarly to the first-type forward searching method, a forgetting factor (indicated as $\kappa(j)$ in Equation 6) may be used to calculate the search spectrum $T_{i,j}(f)$ of the current frame in the first sub-period. The forgetting factor is used to reflect a degree of updating between the weighted spectrum $U_{i-1,j}(f)$ of the previous frame and the smoothed magnitude spectrum $S_{i,j}(f)$ of the current frame, and may be, for example, the differential forgetting factor $\kappa(j)$ defined by Equation 5.

Figure 3:
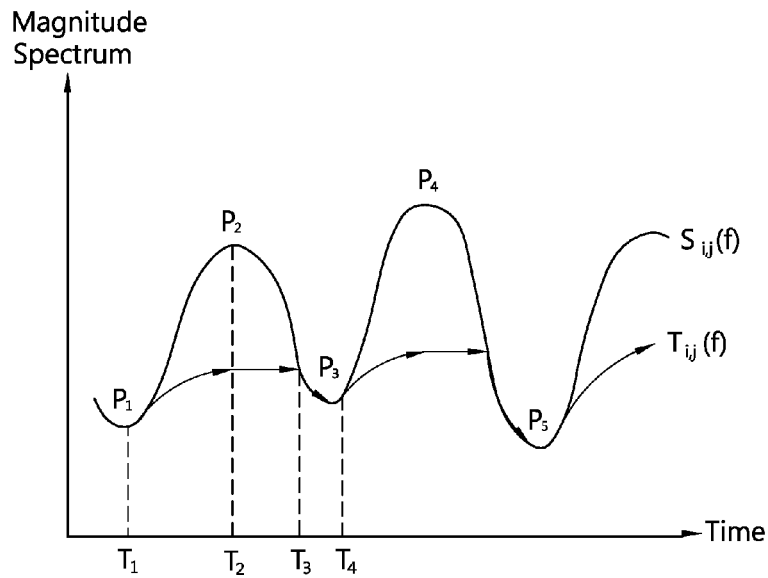
FIG. 3 is a graph of a search spectrum according to a second-type forward searching method.

FIG. 3 is a graph of the search spectrum $T_{i,j}(f)$ according to the second-type forward searching method (Equation 6). In FIG. 3, a horizontal axis represents a time direction, i.e., a frame direction, and a vertical direction represents a magnitude spectrum (the smoothed magnitude spectrum $S_{i,j}(f)$ or the search spectrum $T_{i,j}(f)$. However, in FIG. 3, the smoothed magnitude spectrum $S_{i,j}(f)$ and the search spectrum $T_{i,j}(f)$ are also exemplarily and schematically illustrated without illustrating their details.

Referring to FIG. 3, in the first sub-period where the smoothed magnitude spectrum $S_{i,j}(f)$ increases, similarly to FIG. 2, the search spectrum $T_{i,j}(f)$ according to Equation 6 starts from a first minimum point $P_1$ of the smoothed magnitude spectrum $S_{i,j}(f)$ and increases by following the smoothed magnitude spectrum $S_{i,j}(f)$. In the second sub-period where the smoothed magnitude spectrum $S_{i,j}(f)$ decreases, the search spectrum $T_{i,j}(f)$ according to Equation 6 has the same magnitude as the search spectrum $T_{i,j}(f)$ of the previous frame and thus has the shape of a straight line having a slope of a value 0. In this case, after a time $T_2$ corresponding to a first maximum point $P_2$, although the difference between the smoothed magnitude spectrum $S_{i,j}(f)$ and the search spectrum $T_{i,j})$ is generally decreases, a degree of decreasing is smaller than FIG. 2. At a predetermined time $T_3$ before a time $T_4$ corresponding to a second minimum point $P_3$ of the smoothed magnitude spectrum $S_{i,j}(f)$, the search spectrum $T_{i,j}(f)$ and the smoothed magnitude spectrum $S_{i,j}(f)$ have the same magnitude. After the time $T_3$, the search spectrum $T_{i,j}(f)$ decreases as described above with reference to FIG. 2. Thus, detailed descriptions thereof will be omitted here.

As such, in the second-type forward searching method according to the current embodiment of the present invention, the search spectrum $T_{i,j}(f)$ of the current frame is calculated by using the smoothed magnitude spectrum $S_{i-1,j}(f)$ or the search spectrum $T_{i-1,j}(f)$ of the previous frame, and the smoothed magnitude spectrum $S_{i,j}(f)$ of the current frame, or by using only the search spectrum $T_{i-1,j}(f)$ of the previous frame. Also, the search spectrum $T_{i,j}(f)$ may be used to estimate the noise state of the input noisy speech signal $y(n)$ with respect to a whole frequency range or each sub-band, or to estimate the magnitude of noise, in a subsequent method.

Equation 7 mathematically represents an example of a search spectrum according to the third-type forward searching method.

MathFigure 7

$$T_{i,j}(f) = \begin{cases} T_{i-1,j}(f), & \text{if } S_{i,j}(f) > S_{i-1,j}(f) \\ \kappa(j) \cdot U_{i-1,j}(f) + (1 - \kappa(j)) \cdot S_{i,j}(f), & \text{otherwise} \end{cases} \quad \text{[Math. 7]}$$

Symbols used in Equation 7 are the same as those in Equation 4. Thus, detailed descriptions thereof will be omitted here.

Referring to Equation 7, the third-type forward searching method according to the current embodiment of the present invention inversely performs the second-type forward searching method according to Equation 6. In more detail, in a first-half search period (for example, a first sub-period where the smoothed magnitude spectrum $S_{i,j}(f)$ increases), the search spectrum $T_{i,j}(f)$ of the current frame is calculated by using only the search spectrum $T_{i-1,j}(f)$ of the previous frame. For example, as shown in Equation 7, the search spectrum $T_{i,j}(f)$ of the current frame may be regarded as having the same magnitude as the search spectrum $T_{i-1,j}(f)$ of the previous frame. On the other hand, in a second-half search period (for example, a second sub-period where the smoothed magnitude spectrum $S_{i,j}(f)$ decreases), the search spectrum $T_{i,j}(f)$ of the current frame is calculated by using the smoothed magnitude spectrum $S_{i-1,j}(f)$ or the search spectrum $T_{i-1,j}(f)$ of the previous frame, and the smoothed magnitude spectrum $S_{i,j}(f)$ of the current frame.

Similarly to the first-type and second-type forward searching methods, a forgetting factor (indicated as $\kappa(j)$ in Equation 7) may be used to calculate the search spectrum $T_{i,j}(f)$ of the current frame in the second sub-period. The forgetting factor may be, for example, the differential forgetting factor $\kappa(j)$ that varies based on the sub-band index j, as defined by Equation 5.

Figure 4:
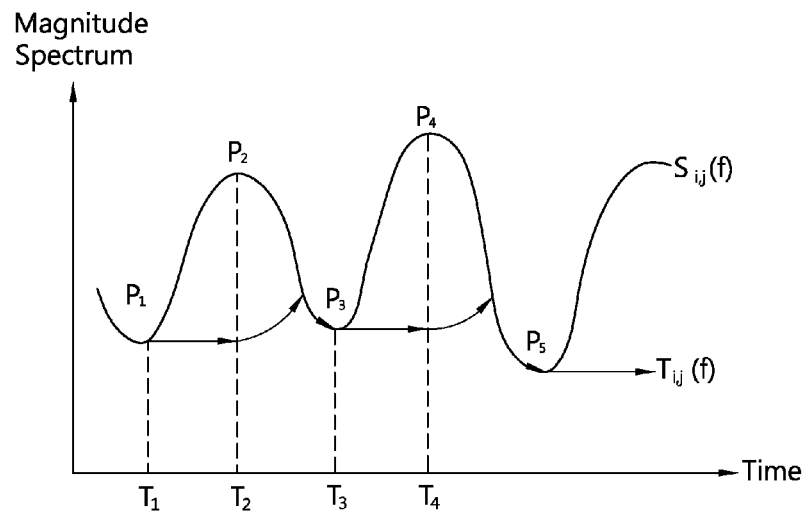
FIG. 4 is a graph of a search spectrum according to a third-type forward searching method.

FIG. 4 is a graph of the search spectrum $T_{i,j}(f)$ according to the third-type forward searching method (Equation 7). In FIG. 4, a horizontal axis represents a time direction, i.e., a frame direction, and a vertical direction represents a magnitude spectrum (the smoothed magnitude spectrum $S_{i,j}(f)$ or the search spectrum $T_{i,j}(0)$. However, in FIG. 4, the smoothed magnitude spectrum $S_{i,j}(f)$ and the search spectrum $T_{i,j}(f)$ are also exemplarily and schematically illustrated without illustrating their details.

Referring to FIG. 4, in the first sub-period where the smoothed magnitude spectrum $S_{i,j}(f)$ increases, similarly to FIG. 2, the search spectrum $T_{i,j}(f)$ according to Equation 7 has the same magnitude as the search spectrum $T_{i-1,j}(f)$ of the previous frame and thus has the shape of a straight line having a slope of zero. As a result, in a first-half search period where the smoothed magnitude spectrum $S_{i,j}(f)$ increases, for example, from a time $T_1$ corresponding to a first minimum point $P_1$ till a time $T_2$ corresponding to a first maximum point $P_2$ of the smoothed magnitude spectrum $S_{i,j}(f)$, the difference between the smoothed magnitude spectrum $S_{i,j}(f)$ and the search spectrum $T_{i,j}(f)$ generally increases, and a degree of increasing is larger than FIG. 2 or FIG. 3.

In the second sub-period where the smoothed magnitude spectrum $S_{i,j}(f)$ decreases, the search spectrum $T_{i,j}(f)$ according to Equation 7 starts from the first minimum point $P_1$ of the smoothed magnitude spectrum $S_{i,j}(f)$ and increases by following the smoothed magnitude spectrum $S_{i,j}(f)$. In this case, after the time $T_2$ corresponding to the first maximum point $P_2$, the difference between the smoothed magnitude spectrum $S_{i,j}(f)$ and the search spectrum $T_{i,j}(f)$ is generally decreases. At a predetermined time $T_3$ before a time $T_4$ corresponding to a second minimum point $P_3$ of the smoothed magnitude spectrum $S_{i,j}(f)$, the search spectrum $T_{i,j}(f)$ and the smoothed magnitude spectrum $S_{i,j}(f)$ have the same magnitude. After the time $T_3$, the search spectrum $T_{i,j}(f)$ decreases by following the smoothed magnitude spectrum $S_{i,j}(f)$ till the time $T_4$ corresponding to the second minimum point $P_3$.

As such, in the third-type forward searching method according to the current embodiment of the present invention, the search spectrum $T_{i,j}(f)$ of the current frame is calculated by using the smoothed magnitude spectrum $S_{i-1,j}(f)$ or the search spectrum $T_{i-1,j}(f)$ of the previous frame, and the smoothed magnitude spectrum $S_{i,j}(f)$ of the current frame, or by using only the search spectrum $T_{i-1,j}(f)$ of the previous frame. Also, the search spectrum $T_{i,j}(f)$ may be used to estimate the ratio of noise of the input noisy speech signal $y(n)$ with respect to a whole frequency range or each sub-band, or to estimate the magnitude of noise.

Referring back to FIG. 1, an identification ratio is calculated by using the smoothed magnitude spectrum $S_{i,j}(f)$ and the search spectrum $T_{i,j}(f)$ calculated by performing the forward searching method (operation S14). The identification ratio is used to determine the noise state of the input noisy speech signal $y(n)$, and may represent the ratio of noise occupied in the input noisy speech signal $y(n)$. The identification ratio may be used to determine whether the current frame is a noise dominant frame or a speech dominant frame, or to identify a noise-like region and a speech-like region in the input noisy speech signal $y(n)$.

The identification ratio may be calculated with respect to a whole frequency range or each sub-band. If the identification ratio is calculated with respect to a whole frequency range, the search spectrum $T_{i,j}(f)$ and the smoothed magnitude spectrum $S_{i,j}(f)$ of all sub-bands may be separately summed by giving a predetermined weight to each sub-band and then the identification ratio may be calculated. Alternatively, the identification ratio of each sub-band may be calculated and then identification ratios of all sub-bands may be summed by giving a predetermined weight to each sub-band.

In order to accurately calculate the identification ratio, only a noise signal should be extracted from the input noisy speech signal $y(n)$. However, if a noisy speech signal is input through a single channel, only the noise signal cannot be extracted from the input noisy speech signal $y(n)$. Thus, according to the current embodiment of the present invention, in order to calculate the identification ratio, the above-mentioned search spectrum $T_{i,j}(f)$, i.e., an estimated noise spectrum is used instead of an actual noise signal.

Thus, according to the current embodiment of the present invention, the identification ratio may be calculated as the ratio of the search spectrum $T_{i,j}(f)$, i.e., the estimated noise spectrum with respect to the magnitude of the input noisy speech signal $y(n)$, i.e., the smoothed magnitude spectrum $S_{i,j}(f)$. However, since a noise signal cannot have a larger magnitude than an original input signal, the identification ratio cannot be larger than a value 1 and, if the noise signal has a larger magnitude than the original input signal, the identification ratio may be set as a value 1.

As such, when the identification ratio is defined according to the current embodiment of the present invention, the noise state may be determined as described below. For example, the identification ratio is close to a value 1, the current frame is included in the noise-like region or corresponds to the noise dominant frame. If the identification ratio is close to a value 0, the current frame is included in the speech-like region or corresponds to the speech dominant frame.

If the identification ratio is calculated by using the search spectrum $T_{i,j}(f)$, according to the current embodiment of the present invention, data regarding a plurality of previous frames is not required and thus a large-capacity memory is not required, and the amount of calculation is small. Also, since the search spectrum $T_{i,j}(f)$ (particularly in Equation 4) adaptively reflects a noise component of the input noisy speech signal $y(n)$, the noise state may be accurately determined or the noise may be accurately estimated.

Equation 8 mathematically represents an example of an identification ratio $\phi_i(j)$ according to the current embodiment of the present invention. In Equation 8, the identification ratio $\phi_i(j)$ is calculated with respect to each sub-band.

Referring to Equation 8, the identification ratio $\phi_i(j)$ in a j-th sub-band is a ratio between a sum of a smoothed magnitude spectrum in the j-th sub-band and a sum of a spectrum having a smaller magnitude between a search spectrum and the smoothed magnitude spectrum. Thus, the identification ratio $\phi_i(j)$ is equal to or larger than a value 0, and cannot be larger than a value 1.

MathFigure 8

$$\phi_i(j) = \frac{\sum_{f=j\cdot SB}^{f-j+1\cdot SB} \min(T_{i,j}(f), S_{i,j}(f))}{\sum_{f=j\cdot SB}^{f-j+1\cdot SB} S_{i,j}(f)} \quad \text{[Math. 8]}$$

Here, i is a frame index, and j ($0 \leq j < J < L$) is a sub-band index obtained by dividing a whole frequency $2^L$ by a sub-band size ($=2^{L-J}$). J and L are natural numbers for respectively determining total numbers of sub-bands and frequency bins. $T_{i,j}(f)$ is an estimated noise spectrum or a search spectrum according to the forward searching method, $S_{i,j}(f)$ is a smoothed magnitude spectrum according to Equation 3, and min(a, b) is a function for indicating a smaller value between a and b.

When the identification ratio $\phi_i(j)$ is defined by Equation 8, a weighted smoothed magnitude spectrum $U_{i,j}(f)$ in Equations 4, 6, and 7 may be represented as shown in Equation 9.

MathFigure 9

$$U_{i,j}(f) = \phi_i(j) \cdot S_{i,j}(f) \quad \text{[Math. 9]}$$

Figure 5:
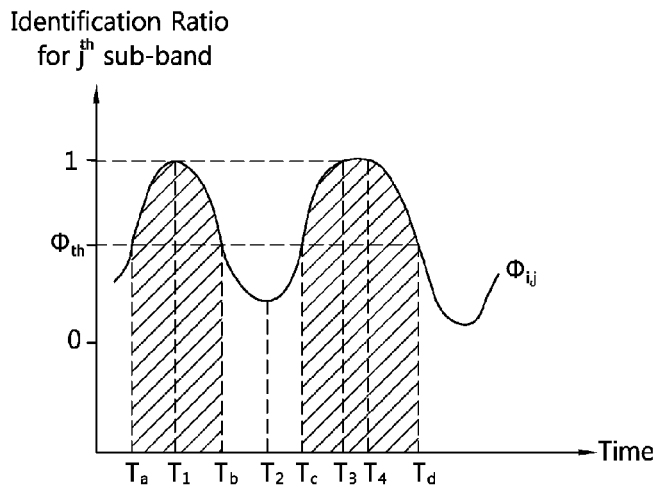
FIG. 5 is a graph for describing an example of a process for determining a noise state by using an identification ratio calculated according to the first embodiment of the present invention.

FIG. 5 is a graph for describing an example of a process for determining a noise state by using the identification ratio $\phi_i(j)$ calculated in operation S14. In FIG. 5, a horizontal axis represents a time direction, i.e., a frame direction, and a vertical direction represents the identification ratio $\phi_i(j)$. The graph of FIG. 5 schematically represents values calculated by applying the smoothed magnitude spectrum $S_{i,j}(f)$ and the search spectrum $T_{i,j}(f)$ with respect to the j-th sub-band, which are illustrated in FIG. 2, to Equation 9. Thus, times $T_1$, $T_2$, $T_3$, and $T_4$ indicated in FIG. 5 correspond to those indicated in FIG. 2.

Referring to FIG. 5, the identification ratio $\phi_i(j)$ is divided into two parts with reference to a predetermined identification ratio threshold value $\phi$th. Here, the identification ratio threshold value $\phi$th may have a predetermined value between values 0 and 1, particularly between values 0.3 and 0.7. For example, the identification ratio threshold value $\phi$th may have a value 0.5. The identification ratio $\phi_i(j)$ is larger than the identification ratio threshold value $\phi$th between times $T_a$ and $T_b$ and between times $T_c$ and $T_d$ (in shaded regions). However, the identification ratio $\phi_i(j)$ is equal to or smaller than the identification ratio threshold value $\phi$th before the time $T_a$, between the times $T_b$ and $T_c$, and after the time $T_d$. According to the current embodiment of the present invention, since the identification ratio $\phi_i(j)$ is defined as a ratio of the search spectrum $T_{i,j}(f)$ with respect to the smoothed magnitude spectrum $S_{i,j}(f)$, a period (frame) where the identification ratio $\phi_i(j)$ is larger than the identification ratio threshold value $\phi$th may be determined as a noise-like region (frame) and a period (frame) where the identification ratio $\phi_i(j)$ is equal to or smaller than the identification ratio threshold value $\phi$th may be determined as a speech-like region (frame).

According to another aspect of the current embodiment of the present invention, the identification ratio $\phi_i(j)$ calculated in operation S14 may also be used to perform VAD for speech recognition. For example, only if the identification ratio $\phi_i(j)$ calculated in operation S14 is equal to or smaller than a predetermined threshold value, it may be regarded that a speech signal exists. If the identification ratio $\phi_i(j)$ is larger than the predetermined threshold value, it may be regarded that a speech signal does not exist.

The above-described noise state determination method of an input noisy speech signal, according to the current embodiment of the present invention, has at least two characteristics as described below.

First, according to the current embodiment of the present invention, since the noise state is determined by using a search spectrum, differently from a conventional VAD method, data represented in a plurality of previous noise frames or a long previous frame is not used. Instead, according to the current embodiment of the present invention, the search spectrum may be calculated with respect to a current frame or each of two or more sub-bands of the current frame by using a forward searching method, and the noise state may be determined by using only an identification ratio calculated by using the search spectrum. Thus, according to the current embodiment of the present invention, a relatively small amount of calculation is required and a required capacity of memory is not large. Accordingly, the present invention may be easily implemented as hardware or software.

Second, according to the current embodiment of the present invention, the noise state may be rapidly determined in a non-stationary environment where a noise level greatly varies or in a variable noise environment, because a search spectrum is calculated by using a forward searching method and a plurality of adaptively variable values such as a differential forgetting factor, a weighted smoothed magnitude spectrum, and/or an identification ratio are applied when the search spectrum is calculated.

Second Embodiment

Figure 6:
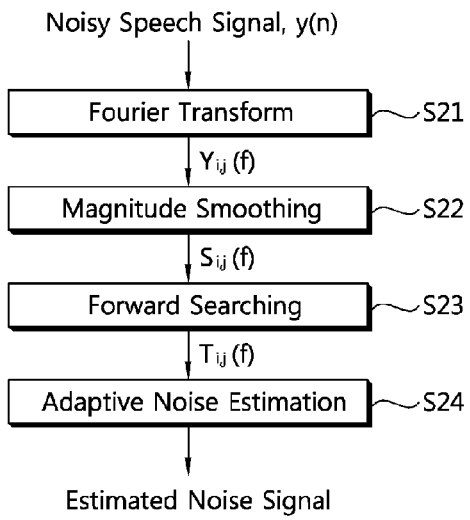
FIG. 6 is a flowchart of a noise estimation method of an input noisy speech signal, according to a second embodiment of the present invention.

FIG. 6 is a flowchart of a noise estimation method of an input noisy speech signal y(n), as a method of processing a noisy speech signal, according to a second embodiment of the present invention.

Referring to FIG. 6, the noise estimation method according to the second embodiment of the present invention includes performing Fourier transformation on the input noisy speech signal y(n) (operation S21), performing magnitude smoothing (operation S22), performing forward searching (operation S23), and performing adaptive noise estimation (operation S24). Here, operations S11 through S13 illustrated in FIG. 1 may be performed as operations S21 through S23. Thus, repeated descriptions may be omitted here.

Initially, the Fourier transformation is performed on the input noisy speech signal y(n) (operation S21). As a result of performing the Fourier transformation, the input noisy speech signal y(n) may be approximated into an FS $Y_{i,j}(f)$.

Then, the magnitude smoothing is performed on the FS $Y_{i,j}(f)$ (operation S22). The magnitude smoothing may be performed with respect to a whole FS or each sub-band. As a result of performing the magnitude smoothing on the FS $Y_{i,j}(f)$, a smoothed magnitude spectrum $S_{i,j}(f)$ is output.

Then, the forward searching is performed on the output smoothed magnitude spectrum $S_{i,j}(f)$ (operation S23). A forward searching method is an exemplary method to be performed with respect to a whole frame or each of a plurality of sub-bands of the frame in order to estimate a noise state of the smoothed magnitude spectrum $S_{i,j}(f)$. Thus, when the noise state is estimated according to the second embodiment of the present invention, any conventional method may be performed instead of the forward searching method. According to the current embodiment of the present invention, the forward searching method may use Equation 4, Equation 6, or Equation 7. As a result of performing the forward searching method, a search spectrum $T_{i,j}(f)$ may be obtained.

When the forward searching is completely performed, noise estimation is performed (operation S24). As described above with reference to FIG. 1, only a noise component cannot be extracted from a noisy speech signal that is input through a single channel. Thus, the noise estimation may be a process for estimating a noise component included in the input noisy speech signal y(n) or the magnitude of the noise component.

In more detail, according to the current embodiment of the present invention, a noise spectrum $$|\hat{N}_{i,j}(f)|$$

(the magnitude of a noise signal) is estimated by using a recursive average (RA) method using an adaptive forgetting factor $\lambda_i(j)$ defined by using the search spectrum $T_{i,j}(f)$. For example, the noise spectrum $$|\hat{N}_{i,j}(f)|$$

may be updated by using the RA method by applying the adaptive forgetting factor $\lambda_i(j)$ to the smoothed magnitude spectrum $S_{i,j}(f)$ of a current frame and an estimated noise spectrum $$|\hat{N}_{i-1,j}(f)|$$

of a previous frame.

According to the current embodiment of the present invention, the noise estimation may be performed with respect to a whole frequency range or each sub-band. If the noise estimation is performed on each sub-band, the adaptive forgetting factor $\lambda_i(j)$ may have a different value for each sub-band. Since the noise component, particularly a musical noise component mostly occurs in a high-frequency band, the noise estimation may be efficiently performed based on noise characteristics by varying the adaptive forgetting factor $\lambda_i(j)$ based on each sub-band.

According to an aspect of the current embodiment of the present invention, although the adaptive forgetting factor $\lambda_i(j)$ may be calculated by using the search spectrum $T_{i,j}(f)$ calculated by performing the forward searching, the current embodiment of the present invention is not limited thereto.

Thus, the adaptive forgetting factor $\lambda_i(j)$ may also be calculated by using a search spectrum for representing an estimated noise state or an estimated noise spectrum by using a known method or a method to be developed in the future, instead of using the search spectrum $T_{i,j}(f)$ calculated by performing the forward searching in operation S23.

According to the current embodiment of the present invention, a noise signal of the current frame, for example, the noise spectrum $|N_{i-1,j}(f)|$ of the current frame is calculated by using a weighted average (WA) method using the smoothed magnitude spectrum $S_{i,j}(f)$ of the current frame and the estimated noise spectrum $|N_{i-1,j}(f)|$ of the previous frame. However, according to the current embodiment of the present invention, differently from a conventional WA method using a fixed forgetting factor, noise variations based on time are reflected and a noise spectrum is calculated by using the adaptive forgetting factor $\lambda_i(j)$ having a different weight for each sub-band. The noise estimation method according to the current embodiment of the present invention may be represented as shown in Equation 10.

MathFigure 10

$$|\hat{N}_{i,j}(f)| = \lambda_i(j) \cdot S_{i,j}(f) + (1-\lambda_i(j)) \cdot |N_{i-1,j}(f)| \quad [\text{Math.10}]$$

According to another aspect of the current embodiment of the present invention, if the current frame is a noise-like frame, in addition to Equation 10, the noise spectrum $|\hat{N}_{i,j}(f)|$ of the current frame may be calculated by using the WA method using the smoothed magnitude spectrum $S_{i,j}(f)$ of $|N_{i-1,j}(f)|$ the current frame and the estimated noise spectrum of the previous frame. If the current frame is a speech-like frame, the noise spectrum $|\hat{N}_{i,j}(f)|$ of the current frame may be calculated by using only the estimated noise spectrum $|N_{i-1,j}(f)|$ of the previous frame. In this case, the adaptive forgetting factor $\lambda_i(j)$ has a value 0 in Equation 10. As a result, the noise spectrum $|\hat{N}_{i,j}(f)|$ of the current frame is identical to the estimated noise spectrum $|N_{i-1,j}(f)|$ of the previous frame.

In particular, according to the current embodiment of the present invention, the adaptive forgetting factor $\lambda_i(j)$ may be continuously updated by using the search spectrum $T_{i,j}(f)$ calculated in operation S23. For example, the adaptive forgetting factor $\lambda_i(j)$ may be calculated by using the identification ratio $\phi_i(j)$ calculated in operation S14 illustrated in FIG. 1, i.e., the ratio of the search spectrum $T_{i,j}(f)$ with respect to the smoothed magnitude spectrum $S_{i,j}(f)$. In this case, the adaptive forgetting factor $\lambda_i(j)$ may be set to be linearly or non-linearly proportional to the identification ratio $\phi_i(j)$, which is different from a forgetting factor that is adaptively updated by using an estimated noise signal of the previous frame.

According to an aspect of the current embodiment of the present invention, the adaptive forgetting factor $\lambda_i(j)$ may have a different value based on a sub-band index. If the adaptive forgetting factor $\lambda_i(j)$ has a different value for each sub-band, a characteristic in that, generally, a low-frequency region is mostly occupied by voiced sound, i.e., a speech signal and a high-frequency region is mostly occupied by voiceless sound, i.e., a noise signal may be reflected when the noise estimation is performed. For example, the adaptive forgetting factor $\lambda_i(j)$ may have a small value in the low-frequency region and have a large value in the high-frequency region. In this case, when the noise spectrum $|\hat{N}_{i,j}(f)|$ of the current frame is calculated, the smoothed magnitude spectrum $S_{i,j}(f)$ of the current frame may be reflected in the high-frequency region more than the low-frequency region. On the other hand, the estimated noise spectrum $|N_{i-1,j}(f)|$ of the previous frame may be reflected more in the low-frequency region than in the high-frequency region. For this, the adaptive forgetting factor $\lambda_i(j)$ may be represented by using a level adjuster $\rho(j)$ that has a differential value based on the sub-band index.

Equations 11 and 12 mathematically respectively represents examples of the adaptive forgetting factor $\lambda_i(j)$ and the level adjuster $\rho(j)$ according to the current embodiment of the present invention.

MathFigure 11

$$\lambda_i(j) = \begin{cases} \dfrac{\phi_i(j) \cdot \rho(j)}{\phi_{th}} - \rho(j), & \text{if } \phi_i(j) > \phi_{th} \\ 0, & \text{otherwise} \end{cases} \quad [\text{Math. 11}]$$

MathFigure 12

$$\rho(j) = b_s + \dfrac{j(b_c - b_s)}{J} \quad [\text{Math. 12}]$$

Here, i and j respectively are a frame index and a sub-band index. $\phi_i(j)$ is an identification ratio for determining a noise state and may have, for example, a value defined in Equation 8. $\phi_{th}$ ($0<\phi_{th}<1$) is an identification ratio threshold value for dividing the input noisy speech signal y(n) into a noise-like sub-band or speech-like sub-band based on the noise state, and may have a value between values 0.3 and 0.7, e.g., a value 0.5. For example, if the identification ratio $\phi_i(j)$ is larger than the identification ratio threshold value $\phi_{th}$, a corresponding sub-band is a noise-like sub-band and, on the other hand, if the identification ratio $\phi_i(j)$ is equal to or smaller than the identification ratio threshold value $\phi_{th}$, the corresponding sub-band is a speech-like sub-band. $B_s$ and be are arbitrary constants for satisfying a correlation of $0 \leq b_s \leq \rho_i(j) < b_e < 1$.

Figure 7:
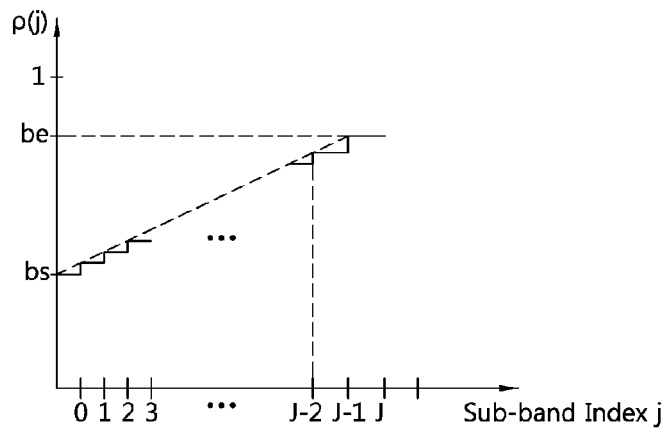
FIG. 7 is a graph showing a level adjuster as a function of a sub-band index.

FIG. 7 is a graph showing the level adjuster $\rho(j)$ in Equation 12 as a function of the sub-band index j.

Referring to FIG. 7, the level adjuster $\rho_i(j)$ has a variable value based on the sub-band index j. According to Equation 11, the level adjuster $\rho_i(j)$ makes the forgetting factor $\lambda_i(j)$ vary based on the sub-band index j. For example, although the level adjuster $\rho_i(j)$ has a small value in a low-frequency region, the level adjuster $\rho_i(j)$ increases as the sub-band index j increases. As such, when the noise estimation is performed (see Equation 10), the input noisy speech signal y(n) is reflected more in the high-frequency region than in the low-frequency region.

Referring to Equation 11, the adaptive forgetting factor $\lambda_i(j)$ ($0<\lambda_i(j)<\rho_i(j)$) varies based on variations in the noise state of a sub-band, i.e., the identification ratio $\phi_i(j)$. Similarly to the first embodiment of the present invention, the identification ratio $\phi_i(j)$ may adaptively vary based on the sub-band index j. However, the current embodiment of the present invention is not limited thereto. As described above, the level adjuster $\rho_i$ (j) increases based on the sub-band index j. Thus, according to the current embodiment of the present invention, the adaptive forgetting factor $\lambda_i(j)$ adaptively varies based on the noise state and the sub-band index j.

Based on Equations 8 and 10 through 12, the noise estimation method illustrated in FIG. 6 will now be described in more detail. For convenience of explanation, it is assumed that the level adjuster $\rho_i(j)$ and the identification ratio threshold value $\phi_{th}$ respectively have values 0.2 and 0.5 in a corresponding sub-band.

Initially, if the identification ratio $\phi_i(j)$ is equal to or smaller than a value 0.5, i.e., the identification ratio threshold value $\phi_{th}$, the adaptive forgetting factor $\lambda_i(j)$ has a value 0 based on Equation 11. Since a period where the identification ratio $\phi_i(j)$ is equal to or smaller than a value 0.5 is a speech-like region, a speech component mostly occupies a noisy speech signal in the speech-like region. Thus, based on Equation 10, the noise estimation is not updated in the speech-like region. In this case, a noise spectrum of a current frame is identical to an estimated noise spectrum of a previous frame $$(|\hat{N}_{i,j}(f)|=|N_{i-1,j}(f)|).$$

If the identification ratio $\phi_i(j)$ is larger than a value 0.5, i.e., the identification ratio threshold value $\phi_{th}$, for example, if the identification ratio $\phi_i(j)$ has a value 1, the adaptive forgetting factor $\lambda_i(j)$ has a value 0.2 based on Equations 11 and 12. Since a period where the identification ratio $\phi_i(j)$ is larger than a value 0.5 is a noise-like region, a noise component mostly occupies the noisy speech signal in the noise-like region. Thus, based on Equation 10, the noise estimation is updated in the noise-like region $$(|\hat{N}_{i,j}(f)|=0.2\times S_{i,j}(f)+0.8\times|N_{i-1,j}(f)|).$$

As described above in detail, differently from a conventional WA method of applying a fixed forgetting factor to each frame regardless of noise variations, a noise estimation method according to the second embodiment of the present invention estimates noise by applying an adaptive forgetting factor that varies based on a noise state of each sub-band. Also, estimated noise is continuously updated in a noise-like region that is mostly occupied by a noise component. However, the estimated noise is not updated in a speech-like region that is mostly occupied by a speech component. Thus, according to the current embodiment of the present invention, noise estimation may be efficiently performed and updated based on noise variations.

According to an aspect of the current embodiment of the present invention, the adaptive forgetting factor may vary based on a noise state of an input noisy speech signal. For example, the adaptive forgetting factor may be proportional to the identification ratio. In this case, the accuracy of noise estimation may be improved by reflecting the input noisy speech signal more in a region mostly occupied by a noise component than in a region mostly occupied by a speech component.

According to another aspect of the current embodiment of the present invention, noise estimation may be performed by using an identification ratio calculated by performing forward searching according to the first embodiment of the present invention, instead of a conventional VAD-based method or an MS algorithm. As a result, according to the current embodiment of the present invention, a relatively small amount of calculation is required and a required capacity of memory is not large. Accordingly, the present invention may be easily implemented as hardware or software.

Third Embodiment

Figure 8:
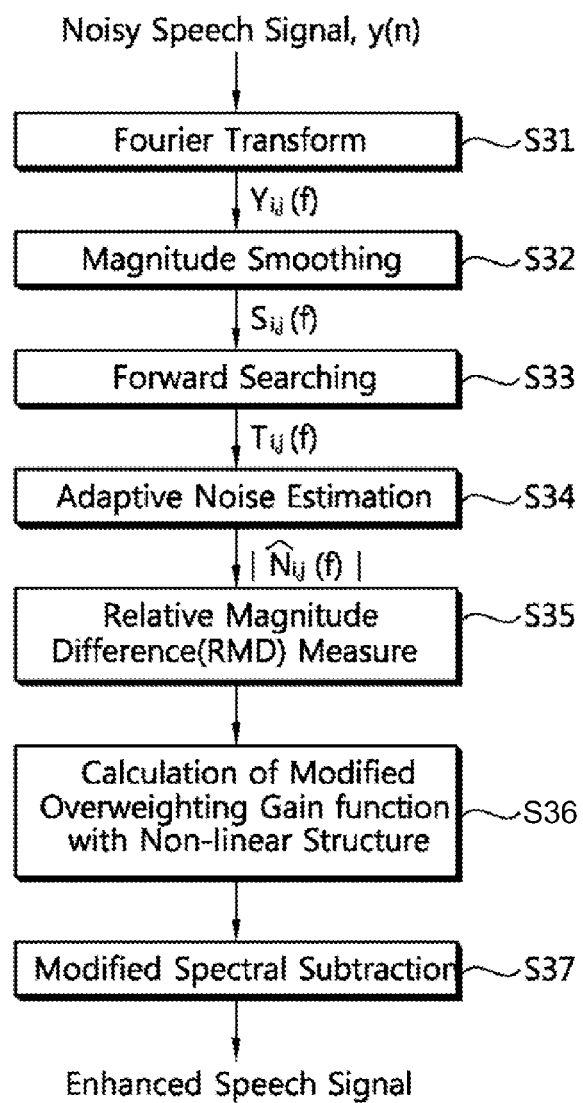
FIG. 8 is a flowchart of a sound quality improvement method of an input noisy speech signal, according to a third embodiment of the present invention.

FIG. 8 is a flowchart of a sound quality improvement method of an input noisy speech signal y(n), as a method of processing a noisy speech signal, according to a third embodiment of the present invention.

Referring to FIG. 8, the sound quality improvement method according to the third embodiment of the present invention includes performing Fourier transformation on the input noisy speech signal y(n) (operation S31), performing magnitude smoothing (operation S32), performing forward searching (operation S33), performing adaptive noise estimation (operation S34), measuring a relative magnitude difference (RMD) (operation S35), calculating a modified overweighting gain function with a non-linear structure (operation S36), and performing modified spectral subtraction (SS) (operation S37).

Here, operations S21 through S24 illustrated in FIG. 6 may be performed as operations S31 through S34. Thus, repeated descriptions may be omitted here. Since one of a plurality of characteristics of the third embodiment of the present invention is to perform operations S35 and S36 by using an estimated noise spectrum, operations S31 through S34 can be performed by using a conventional noise estimation method.

Initially, the Fourier transformation is performed on the input noisy speech signal y(n) (operation S31). As a result of performing the Fourier transformation, the input noisy speech signal y(n) may be approximated into an FS $Y_{i,j}(f)$.

Then, the magnitude smoothing is performed on the FS $Y_{i,j}(f)$ (operation S32). The magnitude smoothing may be performed with respect to a whole FS or each sub-band. As a result of performing the magnitude smoothing on the FS $Y_{i,j}(f)$, a smoothed magnitude spectrum $S_{i,j}(f)$ is output.

Then, the forward searching is performed on the output smoothed magnitude spectrum $S_{i,j}(f)$ (operation S33). A forward searching method is an exemplary method to be performed with respect to a whole frame or each of a plurality of sub-bands of the frame in order to estimate a noise state of the smoothed magnitude spectrum $S_{i,j}(f)$. Thus, when the noise state is estimated according to the third embodiment of the present invention, any conventional method may be performed instead of the forward searching method. Hereinafter, it is assumed that the forward searching method uses a search spectrum $T_{i,j}(f)$ is calculated by using Equation 4, Equation 6, or Equation 7.

Then, noise estimation is performed by using the search spectrum $T_{i,j}(f)$ calculated by performing the forward searching (operation S34). According to an aspect of the current embodiment of the present invention, an adaptive forgetting factor $\lambda_i(j)$ that has a differential value based on each sub-band is calculated and the noise estimation may be adaptively performed by using a WA method using the adaptive forgetting factor $\lambda_i$ (j). For this, a noise spectrum $$|\hat{N}_{i,j}(f)|$$

of a current frame may be calculated by using the WA method using the smoothed magnitude spectrum $S_{i,j}(f)$ of the current frame and an estimated noise spectrum $$|N_{i-1,j}(f)|$$

of a previous frame (see Equations 10, 11, and 12).

Then, as a prior operation before the modified SS is performed in operation S37, an RMD $\gamma_i(j)$ is measured (operation S35). The RMD $\gamma_i(j)$ represents a relative difference between a noisy speech signal and a noise signal which exist on a plurality of sub-bands and is used to obtain an overweighting gain function for inhibiting residual musical noise. Sub-bands obtained by dividing a frame into two or more regions are used to apply a differential weight to each sub-band.

MathFigure 13

$$\gamma_i(j) = 2 \sqrt{\frac{\sum_{f=SBj}^{SB(j+1)} |Y_{i,j}(f)| \sum_{f=SBj}^{SB(j+1)} |W_{i,j}(f)|}{\sum_{f=SBj}^{SB(j+1)} |Y_{i,j}(f)| + \sum_{f=SBj}^{SB(j+1)} |W_{i,j}(f)|}} \quad \text{[Math. 13]}$$

$$= \sqrt{1 - \left(\frac{\sum_{f=SBj}^{SB(j+1)} |X_{i,j}(f)|}{\sum_{f=SBj}^{SB(j+1)} |Y_{i,j}(f)| + \sum_{f=SBj}^{SB(j+1)} |W_{i,j}(f)|}\right)^2}$$

Equation 13 represents the RMD $\gamma_i(j)$ according to a conventional method. In Equation 13, SB and j respectively are a sub-band size and a sub-band index. Equation 13 is different from the current embodiment of the present invention in that Equation 13 represents a case when the magnitude smoothing in operation S32 is not performed. In this case, $Y_{i,j}(f)$ and $X_{i,j}(f)$ respectively are a noisy speech spectrum and a pure speech spectrum, on which the Fourier transformation is performed before the magnitude smoothing is performed, and $$\hat{W}_{i,j}(f)$$

is an estimated noise spectrum calculated by using a signal on which the magnitude smoothing is not performed.

In Equation 13, if the RMD $\gamma_i(j)$ is close to a value 1, a corresponding sub-band is a speech-like sub-band having an enhanced speech component with a relatively small amount of musical noise. On the other hand, if the RMD $\gamma_i(j)$ is close to a value 0, the corresponding sub-band is a noise-like sub-band having an enhanced speech component with a relatively large amount of musical noise. Also, if the RMD $\gamma_i(j)$ has a value 1, the corresponding sub-band is a complete noise sub-band because $$\sum_{f=SBj}^{SB(j+1)} |X_{i,j}(f)| = 0.$$

On the other hand, if the RMD $\gamma_i(j)$ has a value 0, the corresponding sub-band is a complete speech sub-band because $$\sum_{f=SBj}^{SB(j+1)} |W_{i,j}(f)| = 0.$$

However, according to the conventional method, since noise estimation cannot be easily and accurately performed a magnitude $$|Y_i(f)|$$

of a noisy speech signal that is contaminated by non-stationary noise in a single channel, the RMD $\gamma_i(j)$ cannot be easily and accurately calculated.

Thus, according to the current embodiment of the present invention, in order to accurately calculate the RMD $\gamma_i(j)$, the estimated noise spectrum $$|\hat{N}_{i,j}(f)|$$

calculated in operation S34 and max ($S_{i,j}(f)$, $$|\hat{N}_{i,j}(f)|$$

) are used. Equation 14 represents the RMD $\gamma_i(j)$ according to the current embodiment of the present invention. In Equation 14, max (a, b) is a function for indicating a larger value between a and b. In general, since a noise signal included in a noisy speech signal cannot be larger than the noisy speech signal, noise cannot be larger than contaminated speech. Thus, it is reasonable to use max ($S_{i,j}(f)$, $$|\hat{N}_{i,j}(f)|$$

).

MathFigure 14

$$\gamma_i(j) \cong 2 \sqrt{\frac{\sum_{f=SBj}^{SB(j+1)} \max\left(S_{i,j}(f), |\hat{N}_{i,j}(f)|\right) \sum_{f=SBj}^{SB(j+1)} |\hat{N}_{i,j}(f)|}{\sum_{f=SBj}^{SB(j+1)} \max\left(S_{i,j}(f), |\hat{N}_{i,j}(f)|\right) + \sum_{f=SBj}^{SB(j+1)} |\hat{N}_{i,j}(f)|}} \quad \text{[Math. 14]}$$

Then, the modified overweighting gain function is calculated by using the RMD $\gamma_i(j)$ (operation S36). Equation 15 represents a conventional overweighting gain function $\psi_i(j)$ with a non-linear structure, which should be calculated before a modified over-weighting gain function $\zeta_i(j)$ with a non-linear structure, according to the current embodiment of the present invention, is calculated. Here, $\eta$ is a value of the RMD $\gamma_i(j)$ when the amount of speech equals to the amount of noise in a sub-band and the value is $$2\sqrt{2}/3$$

based on Equation 14

$$\left(\sum_{f=SBj}^{SB(j+1)} S_{i,j}(f) = 2 \sum_{f=SBj}^{SB(j+1)} |\hat{N}_{i,j}(f)| = 2 \sum_{f=SBj}^{SB(j+1)} |X_{i,j}(f)|\right).$$

$\xi$ is a level adjustment constant for setting a maximum value of the conventional overweighting gain function $\psi_i(j)$, and $\tau$ is an exponent for changing the shape of the conventional overweighting gain function $\psi_i(j)$.

MathFigure 15

$$\psi_i(j) = \begin{cases} \xi\left(\frac{\gamma_i(j) - \eta}{1 - \eta}\right)^\tau, & \text{if } \gamma_i(j) > \eta \\ 0, & \text{otherwise} \end{cases} \quad \text{[Math. 15]}$$

However, most colored noise in a general environment generates a larger amount of energy in a low-frequency band than in a high-frequency band. Thus, in consideration of characteristics of the colored noise, the current embodiment of the present invention suggests the modified overweighting gain function $\zeta_i(j)$ that is differentially applied to each frequency band. Equation 16 represents the modified overweighting gain function $\zeta_i(j)$ according to the current embodiment of the present invention. The conventional overweighting gain function $\psi_i(j)$ is used to less attenuate voiceless sound by al-locating a low gain to the low-frequency band and a high gain to the high-frequency band. On the other hand, the modified overweighting gain function $\zeta_i(j)$ in Equation 16 allocates a higher gain to the low-frequency band than to the high-frequency band, the effect of noise may be attenuated more in the low-frequency band than in the high-frequency band.

MathFigure 16

$$\zeta_{i,j}(f) = \psi_i(j)\left(\frac{m_e f}{2^{L-1}} + m_s\right) \qquad [\text{Math. 16}]$$

Here, $m_s$ ($m_s > 0$) and $m_e$ ($m_e < 0$, $m_s > m_e$) are arbitrary constants for adjusting the level of the modified overweighting gain function $\zeta_i(j)$.

Figure 9:
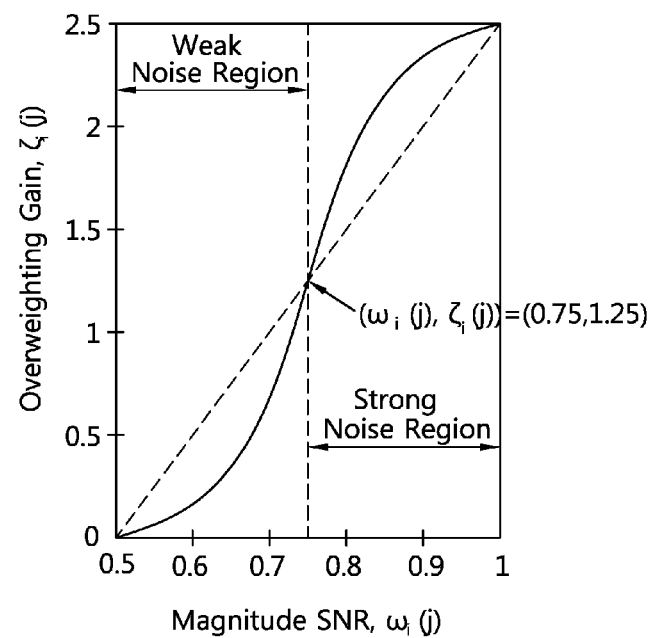
FIG. 9 is a graph showing an example of correlations between a magnitude signal to noise ratio (SNR) and a modified overweighting gain function with a non-linear structure.

FIG. 9 is a graph showing an example of correlations between a magnitude signal to noise ratio (SNR) $\omega_i(j)$ $$\left(\frac{\sum_{f=SB\cdot j}^{SB\cdot(j+1)} |W_{i,j}(f)|}{\sum_{f=SB\cdot j}^{SB\cdot(j+1)} |Y_{i,j}(f)|}\right)$$

and the modified overweighting gain function $\zeta_i(j)$ with a non-linear structure, when the level adjustment constant $\xi$ is set as a value 2.5 with respect to a region where the RMD $\gamma_i(j)$ is larger than the value $\eta$, i.e., $2\sqrt{2}/3$ (a region where the magnitude SNR $\omega_i(j)$ is larger than a value 0.5). In FIG. 9, a vertical dotted line at a center value 0.75 of the magnitude SNR $\omega_i(j)$ is a reference line for dividing the conventional overweighting gain function $\psi_i(j)$ into a strong noise region and a weak noise region in the region where the RMD $\gamma_i(j)$ larger than the value $\eta$.

Referring to FIG. 9 and Equation 16, due to a non-linear structure, the modified over-weighting gain function $\zeta_i(j)$ two main advantages as described below.

First, musical noise may be effectively inhibited from being generated in the strong noise region where more musical noise is generated and which is recognized to be larger than the weak noise region, because a larger amount of noise is attenuated by applying a non-linearly larger weight to a time-varying gain function of the strong noise region than to that of the weak noise region in following equations representing a modified SS method.

Second, clean speech may be reliably provided in the weak noise region where less musical noise is generated and which is recognized to be smaller than the strong noise region, because a smaller amount of speech is attenuated by applying a non-linearly small weight to the time-varying gain function of the weak noise region than to that of the strong noise region in the following equations.

Then, the modified SS is performed by using the modified overweighting gain function $\zeta_i(j)$, thereby obtaining an enhanced speech signal $\hat{X}_{i,j}(f)$ (operation S37). According to the current embodiment of the present invention, the modified SS may be performed by using Equations 17 and 18.

MathFigure 17

$$G_{i,j}(f) = \qquad [\text{Math. 17}]$$

$$\begin{cases} 1 - \frac{(1+\zeta_{i,j}(f))|\hat{N}_{i,j}(f)|}{S_{i,j}(f)}, & \text{if } \frac{|\hat{N}_{i,j}(f)|}{S_{i,j}(f)} < \frac{1}{1+\zeta_{i,j}(f)} \\ \beta \frac{|\hat{N}_{i,j}(f)|}{S_{i,j}(f)}, & \text{otherwise} \end{cases}$$

MathFigure 18

$$\hat{X}_{i,j}(f) = Y_{i,j}(f) G_{i,j}(f) \qquad [\text{Math. 18}]$$

Here, $G_{i,j}(f)$ ($0 \leq G_{i,j}(f) \leq 1$) and $\beta$ ($0 \leq \beta \leq 1$) respectively are a modified time-varying gain function and a spectral smoothing factor.

As described above in detail, the sound quality improvement method according to the current embodiment of the present invention may effectively inhibit musical noise from being generated in a strong noise region where more musical noise is generated and which is recognized to be larger than a weak noise region, thereby efficiently inhibiting artificial sound. Furthermore, less speech distortion occurs and thus more clean speech may be provided in the weak noise region or any other region other than the strong noise region.

According to an aspect of the current embodiment of the present invention, if noise estimation is performed by using a noise estimation method according to the second embodiment of the present invention, noise estimation may be efficiently performed and updated based on noise variations and the accuracy of the noise estimation may be improved. Also, according to another aspect of the current embodiment of the present invention, the noise estimation may be performed by using an identification ratio calculated by performing forward searching according to the first embodiment of the present invention, instead of a conventional VAD-based method or an MS algorithm. Thus, a relatively small amount of calculation is required and a required capacity of memory is not large. Accordingly, the present invention may be easily implemented as hardware or software.

Hereinafter, an apparatus for processing a noisy speech signal, according to an embodiment of the present invention, will be described. The apparatus according to an embodiment of the present invention may be variously implemented as, for example, software of a speech-based application apparatus such as a cellular phone, a bluetooth device, a hearing aid, a speaker phone, or a speech recognition system, a computer-readable recording medium for executing a processor (computer) of the speech-based application apparatus, or a chip to be mounted on the speech-based application apparatus.

Fourth Embodiment

Figure 10:
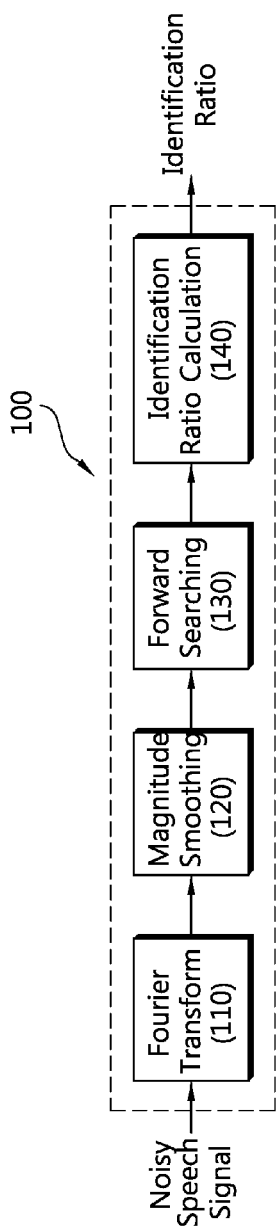
FIG. 10 is a block diagram of a noise state determination apparatus of an input noisy speech signal, according to a fourth embodiment of the present invention.

FIG. 10 is a block diagram of a noise state determination apparatus 100 of an input noisy speech signal, as an apparatus for processing a noisy speech signal, according to a fourth embodiment of the present invention.

Referring to FIG. 10, the noise state determination apparatus 100 includes a Fourier transformation unit 110, a magnitude smoothing unit 120, a forward searching unit 130, and an identification ratio calculation unit 140. According to the current embodiment of the present invention, functions of the Fourier transformation unit 110, the magnitude smoothing unit 120, the forward searching unit 130, and the identification ratio calculation unit 140, which are included in the noise state determination apparatus 100, respectively correspond to operations S11, S12, S13, and S14 illustrated in FIG. 1. Thus, detailed descriptions thereof will be omitted here. The noise state determination apparatus 100 according to the fourth embodiment of the present invention may be included in a speech-based application apparatus such as a speaker phone, a communication device for video telephony, a hearing aid, or a bluetooth device, or a speech recognition system, and may be used to determine a noise state of an input noisy speech signal, and to perform noise estimation, sound quality improvement, and/or speech recognition by using the noise state.

Fifth Embodiment

Figure 11:
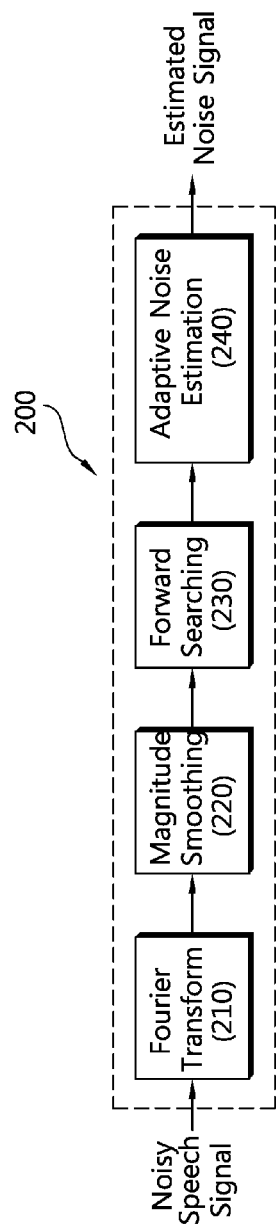
FIG. 11 is a block diagram of a noise estimation apparatus of an input noisy speech signal, according to a fifth embodiment of the present invention.

FIG. 11 is a block diagram of a noise estimation apparatus 200 of an input noisy speech signal, as an apparatus for processing a noisy speech signal, according to a fifth embodiment of the present invention.

Referring to FIG. 11, the noise estimation apparatus 200 includes a Fourier trans-formation unit 210, a magnitude smoothing unit 220, a forward searching unit 230, and a noise estimation unit 240. Also, although not shown in FIG. 11, the noise estimation apparatus 200 may further include an identification ratio calculation unit (refer to the fourth embodiment of the present invention). Functions of the Fourier transformation unit 210, the magnitude smoothing unit 220, the forward searching unit 230, and the noise estimation unit 240, which are included in the noise estimation apparatus 200, respectively correspond to operations S21, S22, S23, and S24 illustrated in FIG. 6. Thus, detailed descriptions thereof will be omitted here. The noise estimation apparatus 200 according to the fifth embodiment of the present invention may be included in a speech-based application apparatus such as a speaker phone, a communication device for video telephony, a hearing aid, or a bluetooth device, or a speech recognition system, and may be used to determine a noise state of an input noisy speech signal, and to perform noise estimation, sound quality improvement, and/or speech recognition by using the noise state.

Sixth Embodiment

Figure 12:
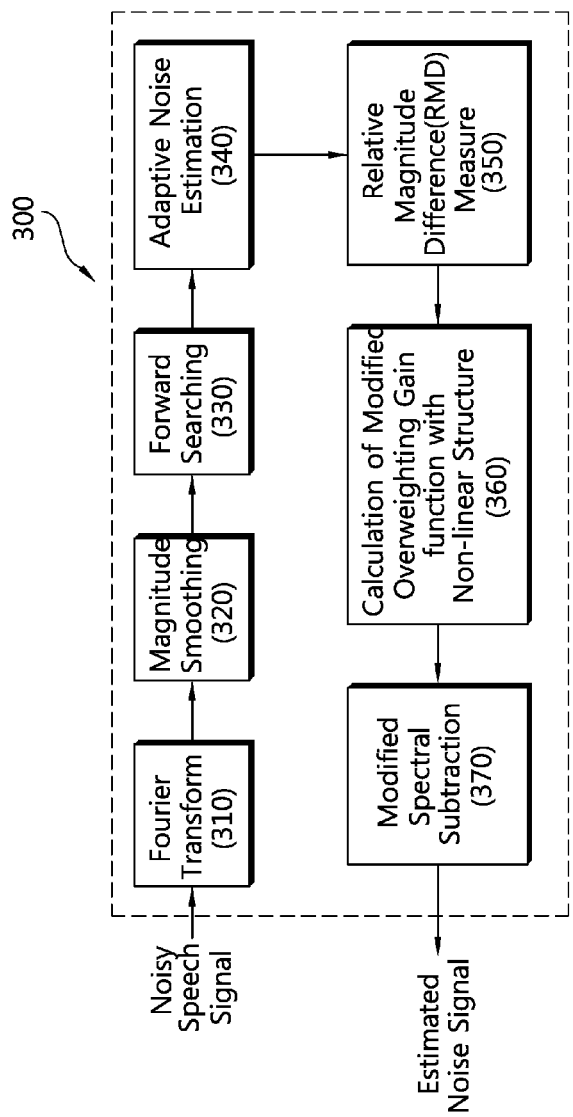
FIG. 12 is a block diagram of a sound quality improvement apparatus of an input noisy speech signal, according to a sixth embodiment of the present invention.

FIG. 12 is a block diagram of a sound quality improvement apparatus 300 of an input noisy speech signal, as an apparatus for processing a noisy speech signal, according to a sixth embodiment of the present invention.

Referring to FIG. 12, the sound quality improvement apparatus 300 includes a Fourier transformation unit 310, a magnitude smoothing unit 320, a forward searching unit 330, a noise estimation unit 340, an RMD measure unit 350, a modified non-linear overweighting gain function calculation unit 360, and a modified SS unit 370. Also, although not shown in FIG. 12, the sound quality improvement apparatus 300 may further include an identification ratio calculation unit (refer to the fourth embodiment of the present invention). Functions of the Fourier transformation unit 310, the magnitude smoothing unit 320, the forward searching unit 330, the noise estimation unit 340, the RMD measure unit 350, the modified non-linear overweighting gain function calculation unit 360, and the modified SS unit 370, which are included in the sound quality improvement apparatus 300, respectively correspond to operations S31 through S37 illustrated in FIG. 8. Thus, detailed descriptions thereof will be omitted here. The sound quality improvement apparatus 300 according to the sixth embodiment of the present invention may be included in a speech-based application apparatus such as a speaker phone, a communication device for video telephony, a hearing aid, or a bluetooth device, or a speech recognition system, and may be used to determine a noise state of an input noisy speech signal, and to perform noise estimation, sound quality improvement, and/or speech recognition by using the noise state.

Seventh Embodiment

Figure 13:
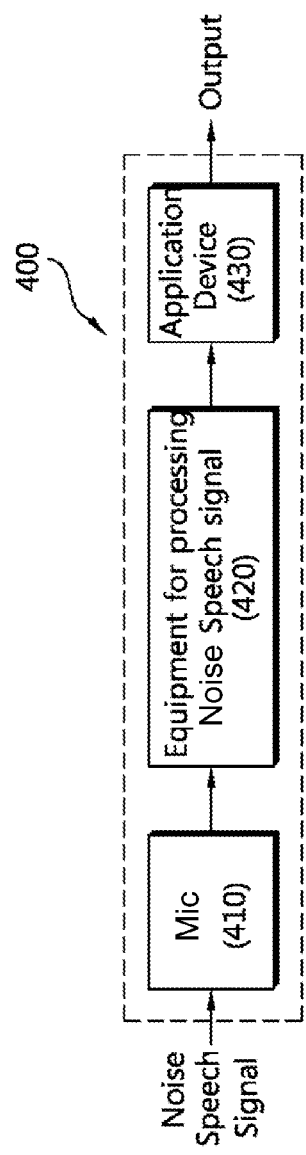
FIG. 13 is a block diagram of a speech-based application apparatus according to a seventh embodiment of the present invention.
Figure 14:
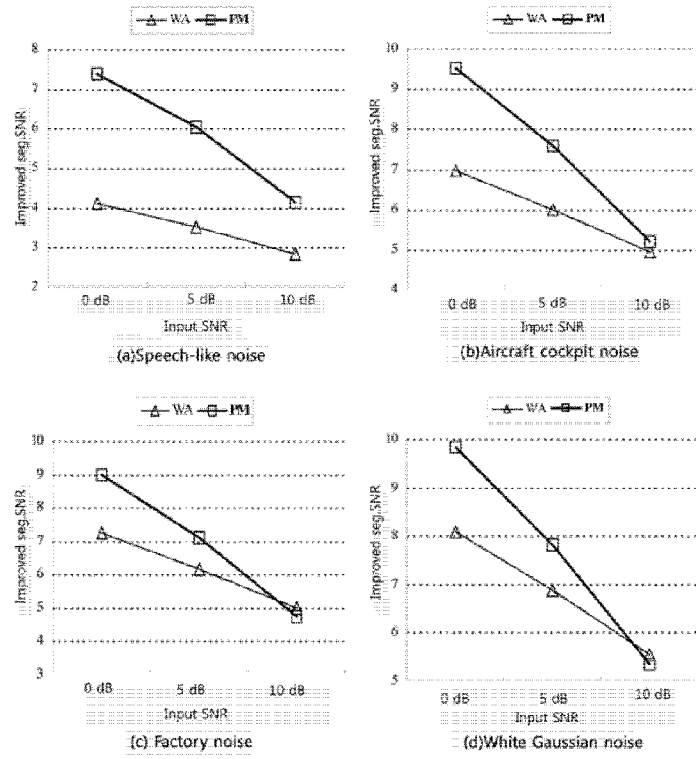
FIGS. 14A through 14D are graphs of an improved segmental SNR for showing the effect of the noise state determination method illustrated in FIG. 1, with respect to an input noisy speech signal including various types of additional noise.
Figure 15:
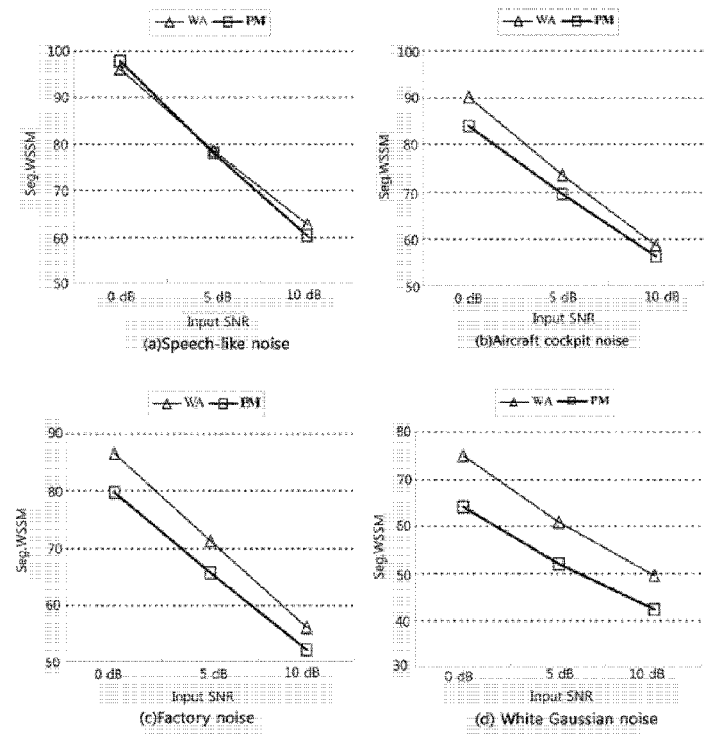
FIGS. 15A through 15D are graphs of a segmental weighted spectral slope measure (WSSM) for showing the effect of the noise state determination method illustrated in FIG. 1, with respect to an input noisy speech signal including various types of additional noise.
Figure 16:
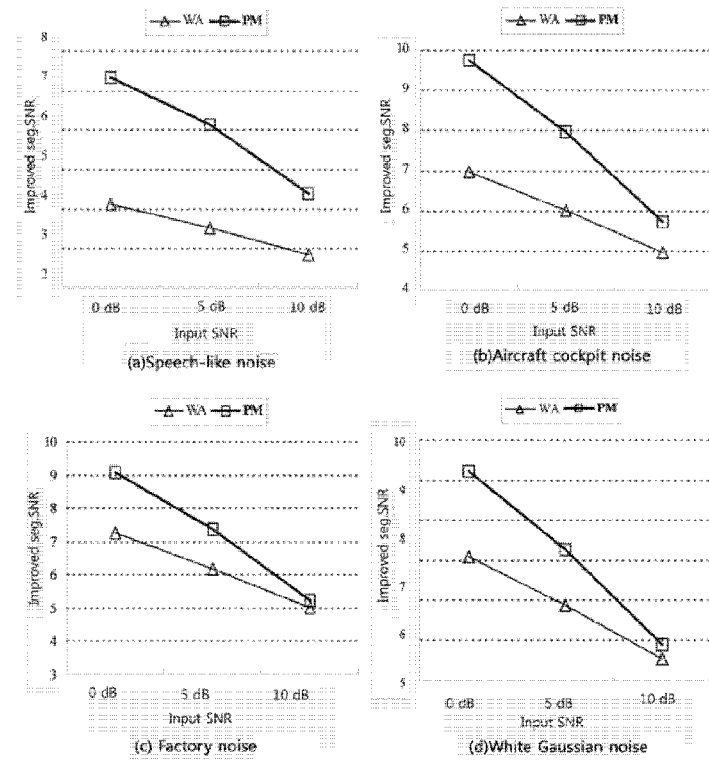
FIGS. 16A through 16D are graphs of an improved segmental SNR for showing the effect of the noise estimation method illustrated in FIG. 6, with respect to an input noisy speech signal including various types of additional noise.
Figure 17:
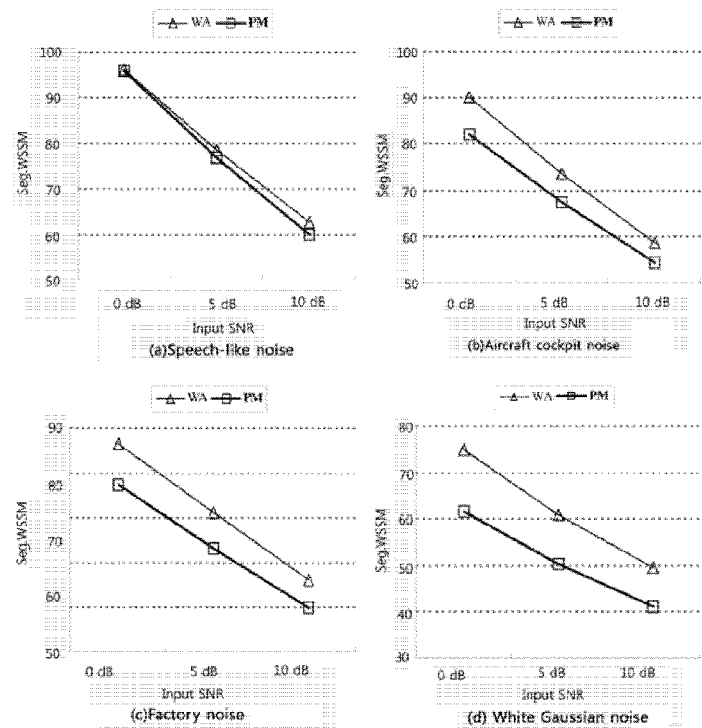
FIGS. 17A through 17D are graphs of a segmental WSSM for showing the effect of the noise estimation method illustrated in FIG. 6, with respect to an input noisy speech signal including various types of additional noise.
Figure 18:
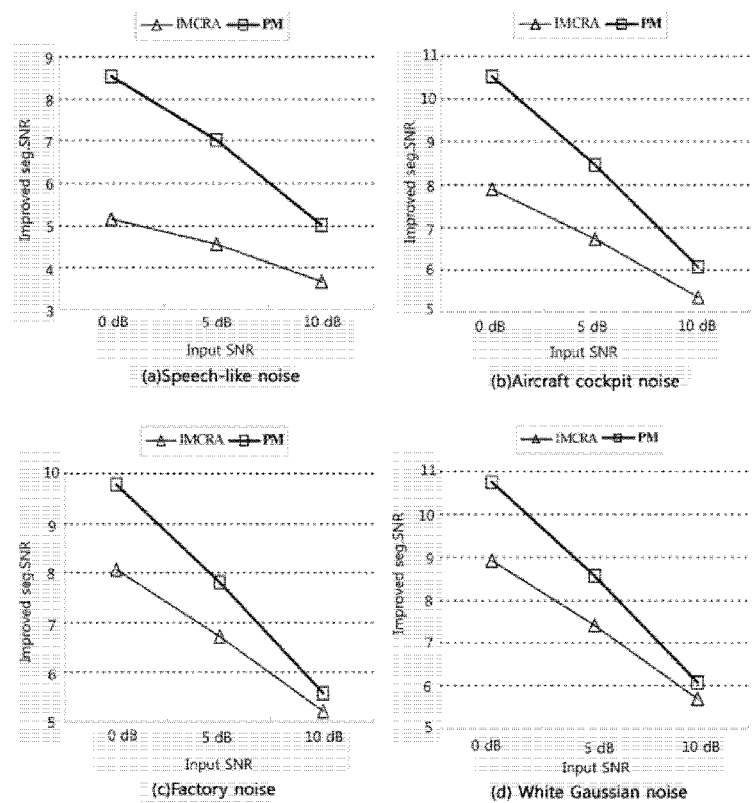
FIGS. 18A through 18D are graphs of an improved segmental SNR for showing the effect of the sound quality improvement method illustrated in FIG. 8, with respect to an input noisy speech signal including various types of additional noise.
Figure 19:
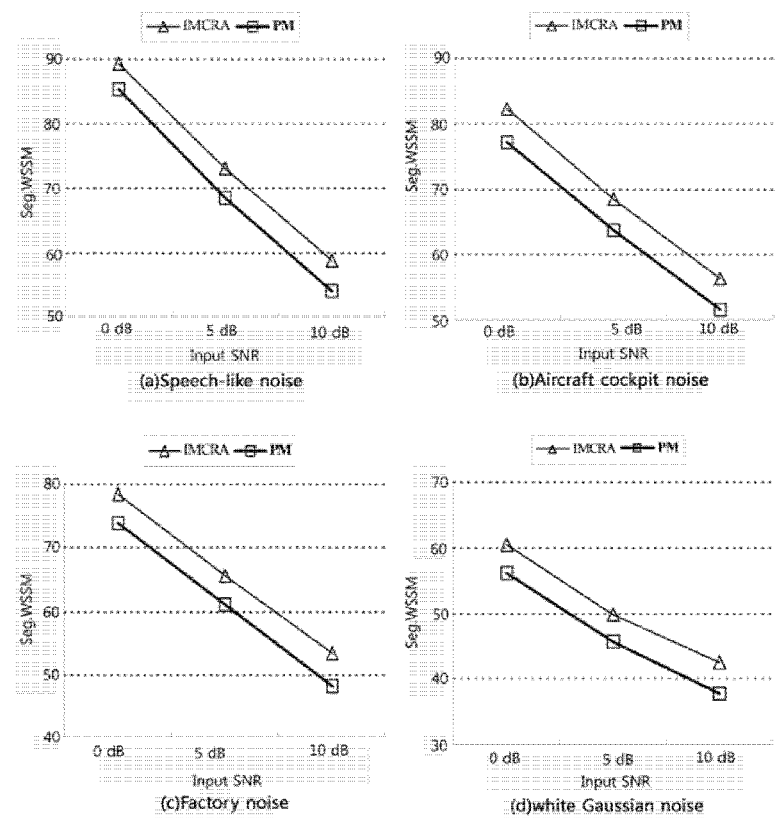
FIGS. 19A through 19D are graphs of a segmental WSSM for showing the effect of the sound quality improvement method illustrated in FIG. 8, with respect to an input noisy speech signal including various types of additional noise.

FIG. 13 is a block diagram of a speech-based application apparatus 400 according to a seventh embodiment of the present invention. The speech-based application apparatus 400 includes the noise state determination apparatus 100 illustrated in FIG. 10, the noise estimation apparatus 200 illustrated in FIG. 11, or the sound quality improvement apparatus 300 illustrated in FIG. 12

Referring to FIG. 13, the speech-based application apparatus 400 includes a mic 410, an equipment for processing Noise Speech signal 420, and an application device 430.

The mic 410 is an input means for obtaining a noisy speech signal and inputting the noisy speech signal to the speech-based application apparatus 400. The equipment for processing Noise Speech signal 420 is used to determine a noise state, to estimate noise, and to output an enhance speech signal by using the estimated noise by processing the noisy speech signal obtained by the mic 410. The equipment for processing Noise Speech signal 420 may have the same configuration as the noise state determination apparatus 100 illustrated in FIG. 10, the noise estimation apparatus 200 illustrated in FIG. 11, or the sound quality improvement apparatus 300 illustrated in FIG. 12. In this case, the equipment for processing Noise Speech signal 420 processes the noisy speech signal by using the noise state determination method illustrated in FIG. 1, the noise estimation method illustrated in FIG. 6, or the sound quality improvement method illustrated in FIG. 8, and generates an identification ratio, an estimated noise signal, or an enhanced speech signal.

The application device 430 uses the identification ratio, the estimated noise signal, or the enhanced speech signal, which is generated by the noisy speech signal processing apparatus 420. For example, the application device 430 may be an output device for outputting the enhanced speech signal outside the speech-based application apparatus 400, e.g., a speaker and/or a speech recognition system for recognizing speech in the enhanced speech signal, a codec device for compressing the enhanced speech signal, and/or a transmission device for transmitting the compressed speech signal through a wired/wireless communication network.

Test Result

In order to evaluate the performances of the noise state determination method illustrated in FIG. 1, the noise estimation method illustrated in FIG. 6, and the sound quality improvement method illustrated in FIG. 8, a qualitative test as well as a quantitative test are performed. Here, the qualitative test means an informal and subjective listening test and a spectrum test, and the quantitative test means calculation of an improved segmental SNR and a segmental weighted spectral slope measure (WSSM).

The improved segmental SNR is calculated by using Equations 19 and 20 and the segmental WSSM is calculated by using Equations 21 and 22.

MathFigure 19

$$Seg \cdot SNR = \frac{1}{M}\sum_{i=0}^{M-1} 10\log\frac{\sum_{n=0}^{F-1} x^2(n+iF)}{\sum_{n=0}^{F-1}[\hat{x}(n+iF)-x(n+iF)]^2} \quad [\text{Math. 19}]$$

MathFigure 20

$$Seg \cdot SNR_{Imp} = Seg \cdot SNR_{Output} - Seg \cdot SNR_{Input} \quad [\text{Math. 20}]$$

Here, M, F, x(n), and $\hat{x}(n)$ respectively are a total number or frames, a frame size, a clean speech signal, and an enhanced speech signal. Seg.SNR$_{Input}$ and Seg.SNR$_{Output}$ respectively are the segmental SNR of a contaminated speech signal and the segmental SNR of the enhanced speech signal MathFigure 21

$$WSSM(i) = \Omega_{SPL} - (\Omega - \hat{\Omega}) + \sum_{r=0}^{CB-1} \Lambda(r)(|X_i(r)| - |\hat{X}_i(r)|)^2 \quad [\text{Math. 21}]$$

MathFigure 22

$$Seg \cdot WSSM = \frac{1}{M}\sum_{i=0}^{M-1} WSSM(i) \quad [\text{Math. 22}]$$

Here, CB is a total number of threshold bands. $\Omega$, $\hat{\Omega}$, QSPL, and $\Lambda(r)$ respectively are a sound pressure level (SPL) of clean speech, the SPL of enhanced speech, a variable coefficient for controlling an overall performance, and a weight of each threshold band. Also, $|X_i(r)|$ and $|\hat{X}_i(r)|$ respectively are magnitude spectral slopes at center frequencies of threshold bands of the clean speech signal x(n) and the enhanced speech signal.

Based on a result of the subjective test result, according to the present invention, residual musical noise is hardly observed and distortion of an enhanced speech signal is greatly reduced in comparison to a conventional method. Here, the conventional method is a reference method to which the test result of the performances according to the present invention is compared, and a WA method (scaling factor α=0.95, threshold value β=2) is used as the conventional method. The test result of the quantitative test supports the test result of the qualitative test.

In the quantitative test, speech signals of 30 sec. (male speech signals of 15 sec. and female speech signals of 15 sec.) are selected from a Texas Instruments/Massachusetts Institute of Technology (TIMIT) database and the duration each speech signal is 6 sec. or more. Four noise signals are used as additive noise. The noise signals are selected from a NoiseX-92 database and respectively are speech-like noise, aircraft cockpit noise, factory noise, and white Gaussian noise. Each speech signal is combined with different types of noise at SNRs of 0 dB, 5 dB, and 10 dB. A sampling frequency of all signals is 16 kHz and each frame is formed as a 512 sample (32 ms) having 50% of overlapping.

FIGS. 14A through 14D are graphs of an improved segmental SNR for showing the effect of the noise state determination method illustrated in FIG. 1.

FIGS. 14A through 14D respectively show test results when speech-like noise, aircraft cockpit noise, factory noise, and white Gaussian noise are used as additional noise (the same types of noise are used in FIGS. 15A through 15D, 16A through 16D, 17A through 17D, 18A through 18D, and 19A through 19D). In 14A through 14D, 'PM' indicates the improved segmental SNR calculated in an enhanced speech signal obtained by performing forward searching according to the noise state determination method illustrated in FIG. 1, and 'WA' indicates the improved segmental SNR calculated in an enhanced speech signal obtained by performing a conventional WA method.

Referring to 14A through 14D, according to the noise state determination method illustrated in FIG. 1, a segmental SNR is greatly improved regardless of an input SNR. In particular, if the input SNR is low, the segmental SNR is more greatly improved. However, when the factory noise or the white Gaussian noise is used, if the input SNR is 10 dB, the segmental SNR is hardly improved.

FIGS. 15A through 15D are graphs of a segmental WSSM for showing the effect of the noise state determination method illustrated in FIG. 1.

Referring to 15A through 15D, according to the noise state determination method illustrated in FIG. 1, the segmental WSSM is generally reduced regardless of an input SNR. However, when the speech-like noise is used, if the input SNR is low, the segmental WSSM can increase a little bit.

FIGS. 16A through 16D are graphs of an improved segmental SNR for showing the effect of the noise estimation method illustrated in FIG. 6. In 16A through 16D, 'PM' indicates the improved segmental SNR calculated in an enhanced speech signal obtained by performing forward searching and adaptive noise estimation according to the noise estimation method illustrated in FIG. 6, and 'WA' indicates the improved segmental SNR calculated in an enhanced speech signal obtained by performing a conventional WA method.

Referring to 16A through 16D, according to the noise estimation method illustrated in FIG. 6, a segmental SNR is greatly improved regardless of an input SNR. In particular, if the input SNR is low, the segmental SNR is more greatly improved.

FIGS. 17A through 17D are graphs of a segmental WSSM for showing the effect of the noise estimation method illustrated in FIG. 6.

Referring to 17A through 17D, according to the noise estimation method illustrated in FIG. 6, the segmental WSSM is generally reduced regardless of an input SNR.

FIGS. 18A through 18D are graphs of an improved segmental SNR for showing the effect of the sound quality improvement method illustrated in FIG. 8. In 18A through 18D, 'PM' indicates the improved segmental SNR calculated in an enhanced speech signal obtained by performing forward searching, adaptive noise estimation, and a modified over-weighting gain function with a non-linear structure, based on a modified SS according to the sound quality improvement method illustrated in FIG. 8, and 'IMCRA' indicates the improved segmental SNR calculated in an enhanced speech signal obtained by performing a conventional improved minima controlled recursive average (IMCRA) method.

Referring to 18A through 18D, according to the sound quality improvement method illustrated in FIG. 8, a segmental SNR is greatly improved regardless of an input SNR. In particular, if the input SNR is low, the segmental SNR is more greatly improved.

FIGS. 19A through 19D are graphs of a segmental WSSM for showing the effect of the sound quality improvement method illustrated in FIG. 8.

Referring to 19A through 19D, according to the sound quality improvement method illustrated in FIG. 8, the segmental WSSM is generally reduced regardless of an input SNR.

While the present invention has been particularly shown and described with reference to exemplary embodiments thereof, it will be understood by those of ordinary skill in the art that various changes in form and details may be made therein without departing from the spirit and scope of the present invention as defined by the following claims.

Industrial Applicability

The present invention may be used in manufacturing industries of cellular phones, speaker phones, hearing aids, etc. for processing noisy speech signals, and in industries of processors, speech processors, computer programs, etc. which are required by the above products.

The invention claimed is:

1. A noise state determination method of a noisy speech signal, the method comprising:
    calculating a transformed spectrum by transforming an input noisy speech signal to a frequency domain;
    calculating a smoothed magnitude spectrum by reducing magnitude differences of the transformed spectrum between neighboring frames;
    calculating a search spectrum which represents an estimated noise component of the smoothed magnitude spectrum; and
    calculating an identification ratio which represents a ratio of a noise component included in the input noisy speech signal, by using the smoothed magnitude spectrum and the search spectrum;
    wherein a whole frequency range of the frequency domain is divided into subbands, and the calculating of the search spectrum and the calculating of the identification ratio are performed on a sub-band basis, and
    wherein the search spectrum is calculated by using Equation E-1

$$T_{i,j}(f) = \kappa(j) \cdot U_{i-1,j}(f) + (1 - \kappa(j)) \cdot S_{i,j}(f) \quad \text{(E-1)}$$

wherein, i is a frame index, j ($0 \leq j < J < L$) is a sub-band index obtained by dividing a predetermined frequency range $2^L$ by a sub-band size ($=2^{L-J}$), J and L are natural numbers which respectively determining a total number of the sub-bands and the predetermined frequency range, $T_{i,j}(f)$ is the search spectrum, $S_{i,j}(f)$ is the smoothed magnitude spectrum, $U_{i-1,j}(f)$ is a weighted spectrum indicating a spectrum having a smaller magnitude between the search spectrum and the smoothed magnitude spectrum of the previous frame, and $\kappa(j)$ ($0 < \kappa(J-1) \leq \kappa(j) \leq \kappa(0) \leq 1$) is a differential forgetting factor.

2. The method of claim 1, wherein the smoothed magnitude spectrum is calculated by using Equation E-2

$$S_i(f) = \alpha_s S_{i-1}(f) + (1-\alpha_s)|Y_i(f)| \quad \text{(E-2)}$$

Here, i is a frame index, f is a frequency, $S_{i-1}(f)$ and $S_i(f)$ respectively are smoothed magnitude spectrums of (i−1)th and ith frames, $Y_i(f)$ is a transformed spectrum of the ith frame, and $\alpha_s$ is a smoothing factor.

3. The method of claim 2, wherein the calculating of the search spectrum comprises calculating the search spectrum of a current frame by using only the search spectrum of a previous frame or using the smoothed magnitude spectrum of the current frame and a spectrum having a smaller magnitude between the search spectrum and the smoothed magnitude spectrum of the previous frame.

4. The method of claim 3, wherein the search spectrum is calculated by using Equation E-3

$$T_{i,j}(f) = \begin{cases} \kappa(j) \cdot U_{i-1,j}(f) + (1-\kappa(j)) \cdot S_{i,j}(f), & \text{if } S_{i,j}(f) > S_{i-1,j}(f) \\ T_{i-1,j}(f) & \text{otherwise.} \end{cases} \quad \text{(E-3)}$$

5. The method of claim 3, wherein the search spectrum is calculated by using Equation E-4

$$T_{i,j}(f) = \begin{cases} T_{i-1,j}(f), & \text{if } S_{i,j}(f) > S_{i-1,j}(f) \\ \kappa(j) \cdot U_{i-1,j}(f) + (1-\kappa(j)) \cdot S_{i,j}(f), & \text{otherwise.} \end{cases} \quad \text{(E-4)}$$

6. The method of claim 3, wherein the differential forgetting factor is inversely proportional to the sub-band index.

7. The method of claim 6, wherein the differential forgetting factor is represented as shown in Equation E-5

$$\kappa(j) = \frac{J\kappa(0) - j(\kappa(0) - \kappa(J-1))}{J} \quad \text{(E-5)}$$

Here, $0 < \kappa(J-1) \leq \kappa(j) \leq \kappa(0) \leq 1$.

8. The method of claim 3, wherein the identification ratio is calculated by using Equation E-6

$$\phi_i(j) = \frac{\sum_{f=j \cdot SB}^{f=j+1 \cdot SB} \min(T_{i,j}(f), S_{i,j}(f))}{\sum_{f=j \cdot SB}^{f=j+1 \cdot SB} S_{i,j}(f)} \quad \text{(E-6)}$$

Here, SB is a sub-band size and min(a, b) indicates a smaller value of the values a and b.

9. The method of claim 8, wherein the weighted spectrum is defined as shown in Equation E-7

$$U_{i,j}(f) = \phi_i(j) \cdot S_{i,j}(f) \quad \text{(E-7)}.$$

10. The method of claim 8, wherein, if the identification ratio is larger than a predetermined threshold value, a sub-band is determined as a noise-like sub-band, and, if the identification ratio is equal to or smaller than the threshold value, a sub-band is determined as a speech-like sub-band.

11. The method of claim 1, wherein the transformed spectrum is calculated by performing Fourier transformation.

12. A method of processing a noisy speech signal of a time domain, the method comprising:
    generating a transformed signal by performing Fourier transformation on the noisy speech signal;
    performing forward searching so as to calculate a search signal which represents an estimated noise component of the noisy speech signal; and
    determining a noise state of the noisy speech signal by using the transformed signal and the search signal,
    wherein the search signal is calculated by applying a differential forgetting factor to the transformed signal of a current frame and a signal having a smaller magnitude between the search signal and the transformed signal of a previous frame, wherein the search signal is calculated by using a smoothed signal which is calculated by reducing magnitude differences of the noisy speech signal between neighboring frames, wherein the search signal is calculated with respect to a plurality of sub-bands obtained by dividing a whole frequency range of a frequency domain, and wherein the search signal is calculated by using Equation E-8

$$T_{i,j}(f) = \kappa(j) \cdot U_{i-1,j}(f) + (1-\kappa(j)) \cdot S_{i,j}(f) \quad \text{(E-8)}$$

wherein, i is a frame index, j ($0 \leq j < J < L$) is a sub-band index obtained by dividing a predetermined frequency range $2^L$ by a sub-band size ($=2^{L-J}$), J and L are natural numbers which respectively determine a total number of the sub-bands and the predetermined frequency range, $T_{i,j}(f)$ is the search signal, $S_{i,j}(f)$ is the smoothed signal, $U_{i-1,j}(f)$ is a weighted signal indicating a signal having a smaller magnitude between the search signal and the smoothed signal of the previous frame, and $\kappa(j)$ ($0 < \kappa(J-1) \leq \kappa(j) \leq \kappa(0) \leq 1$) is the differential forgetting factor.

13. The method of claim 12, wherein the forgetting factor is a differential forgetting factor which has a smaller value in a high-frequency band than in a low-frequency band.

14. The method of claim 12, wherein the search signal is identical to the search signal of the previous frame in a period where a magnitude of the transformed signal increases.

15. The method of claim 12, wherein the search signal is identical to the search signal of the previous frame in a period where a magnitude of the transformed signal decreases and is larger than the magnitude of the search signal.

16. A noise state determination apparatus of a noisy speech signal, the apparatus comprising:
a transformation unit for calculating a transformed spectrum by transforming an input noisy speech signal to a frequency domain;
a smoothing unit for calculating a smoothed magnitude spectrum by reducing magnitude differences of the transformed spectrum between neighboring frames;
a forward searching unit for calculating a search spectrum which represents an estimated noise component of the smoothed magnitude spectrum; and
a noise state determination unit for calculating an identification ratio which represents a ratio of a noise component included in the input noisy speech signal, by using the smoothed magnitude spectrum and the search spectrum.

17. An apparatus for processing a noisy speech signal of a time domain, wherein the apparatus comprising:
a transformation unit configured to generates a transformed signal by performing Fourier transformation on the noisy speech signal;
a smoothing unit for calculating a smoothed signal by reducing magnitude differences of the transformed signal between neighboring frames;
a forward searching unit configured to performs forward searching so as to calculate a search signal which represents an estimated noise component of the transformed signal; and
a noise state determination unit configured to determine a noise state of the noisy speech signal by using the transformed signal and the search signal, and
wherein the search signal is calculated by applying a differential forgetting factor to the transformed signal of a current frame and a signal having a smaller magnitude between the search signal and the transformed signal of a previous frame, wherein a whole frequency range of a frequency domain is divided into subbands, and the calculating of the search signal and the calculating of the noise state are performed on a sub-band basis, and wherein the search signal is calculated by using Equation E-10

$$T_{i,j}(f) = \kappa(j) \cdot U_{i-1,j}(f) + (1-\kappa(j)) \cdot S_{i,j}(f) \quad \text{(E-10)}$$

wherein, i is a frame index, j ($0 \leq j < J < L$) is a sub-band index obtained by dividing a predetermined frequency range $2^L$ by a sub-band size ($=2^{L-J}$), J and L are natural numbers which respectively determining a total number of the sub-bands and the predetermined frequency range, $T_{i,j}(f)$ is the search signal, $S_{i,j}(f)$ is the smoothed signal, $U_{i-1,j}(f)$ is a weighted signal indicating a signal having a smaller magnitude between the search signal and the smoothed signal of the previous frame, and $\kappa(j)$ ($0 < \kappa(J-1) \leq \kappa(j) \leq \kappa(0) \leq 1$) is the differential forgetting factor.

18. A non-transitory computer readable recording medium having recorded thereon a computer program for executing a noise state determination method of a noisy speech signal, the method comprising:
calculating a transformed spectrum by transforming an input noisy speech signal to a frequency domain;
calculating a smoothed magnitude spectrum by reducing magnitude differences of the transformed spectrum between neighboring frames;
calculating a search spectrum which represents an estimated noise component of the smoothed magnitude spectrum; and
calculating an identification ratio which represents a ratio of a noise component included in the input noisy speech signal, by using the smoothed magnitude spectrum and the search spectrum,
wherein a whole frequency range of the frequency domain is divided into subbands, and the calculating of the search spectrum and the calculating of the identification ratio are performed on a subband basis, and
wherein the search spectrum is calculated by using Equation E-11

$$T_{i,j}(f) = \kappa(j) \cdot U_{i-1,j}(f) + (1-\kappa(j)) \cdot S_{i,j}(f) \quad \text{(E-11)}$$

wherein, i is a frame index, j ($0 \leq j < J < L$) is a sub-band index obtained by dividing a predetermined frequency range $2^L$ by a subband size ($=2^{L-J}$), J and L are natural numbers which respectively determining a total number of the sub-bands and the predetermined frequency range, $T_{i,j}(f)$ is the search spectrum, $S_{i,j}(f)$ is the smoothed magnitude spectrum, $U_{i-1,j}$ is a weighted spectrum indicating a spectrum having a smaller magnitude between the search spectrum and the smoothed magnitude spectrum of the previous frame, and $\kappa(j)$ ($0 < \kappa(J-1) \leq \kappa(j) \leq \kappa(0) \leq 1$) is a differential forgetting factor.

19. A non-transitory computer readable recording medium having recorded thereon a computer program for executing a method of processing a noisy speech signal of a time domain, the method comprising:
generating a transformed signal by performing Fourier transformation on the noisy speech signal;
generating a smoothed signal by reducing magnitude differences of the transformed signal between neighboring frames;
performing forward searching so as to calculate a search signal which represents an estimated noise component of the transformed signal; and
determining a noise state of the noisy speech signal by using the transformed signal and the search signal, wherein the search signal is calculated by applying a differential forgetting factor to the transformed signal of a current frame and a signal having a smaller magnitude between the search signal and the transformed signal of a previous frame, a whole frequency range of a frequency domain is divided into subbands, and the generating of the search signal and the determining of the noise state are performed on a subband basis, and the search signal is calculated by using Equation E-12

$$T_{i,j}(f) = \kappa(j) \cdot U_{i-1,j}(f) + (1-\kappa(j)) \cdot S_{i,j}(f) \qquad \text{E-12}$$

wherein, i is a frame index, j ($0 \leq j < J < L$) is a sub-band index obtained by dividing a predetermined frequency range $2^L$ by a sub-band size ($=2^{L-J}$), J and L are natural numbers which respectively determining a total number of the sub-bands and the predetermined frequency range, $T_{i,j}(f)$ is the search signal, $S_{i,j}(f)$ is the smoothed signal, $U_{i-1,j}(f)$ is a weighted signal indicating a signal having a smaller magnitude between the search signal and the smoothed signal of the previous frame, and $\kappa(j)$ ($0 < \kappa(J-1) \leq \kappa(j) \leq \kappa(0) \leq 1$) is the differential forgetting factor.

* * * * *